United States Patent
Kaufmann et al.

(10) Patent No.: US 9,538,374 B2
(45) Date of Patent: Jan. 3, 2017

(54) METHOD FOR VEHICLE COMMUNICATION BY MEANS OF A VEHICLE-IMPLEMENTED VEHICLE DIAGNOSTIC SYSTEM, VEHICLE DIAGNOSTIC INTERFACE, INTERACE MODULE, USER COMMUNICATION TERMINAL, DATA CONNECTION SYSTEM, AND DIAGNOSTIC AND CONTROL NETWORK FOR A PLURALITY OF VEHICLES

(75) Inventors: Stephan Kaufmann, Frankfurt am Main (DE); Alexander Marten, Düsseldorf (DE)

(73) Assignee: Flycar Innovations GmbH, Frankfurt (DE)

( * ) Notice: Subject to any disclaimer, the term of this patent is extended or adjusted under 35 U.S.C. 154(b) by 0 days.

(21) Appl. No.: 14/122,107

(22) PCT Filed: May 25, 2012

(86) PCT No.: PCT/EP2012/059920
§ 371 (c)(1),
(2), (4) Date: Feb. 26, 2014

(87) PCT Pub. No.: WO2012/163862
PCT Pub. Date: Dec. 6, 2012

(65) Prior Publication Data
US 2014/0200760 A1    Jul. 17, 2014

(30) Foreign Application Priority Data
May 27, 2011   (DE) .................. 10 2011 076 638

(51) Int. Cl.
*G06F 11/00* (2006.01)
*H04W 12/06* (2009.01)
(Continued)

(52) U.S. Cl.
CPC .............. *H04W 12/06* (2013.01); *G07C 5/008* (2013.01); *G08G 1/162* (2013.01); *G08G 1/205* (2013.01)

(58) Field of Classification Search
CPC ........................................................ G06F 19/00
See application file for complete search history.

(56) References Cited

U.S. PATENT DOCUMENTS 6,330,499 B1    12/2001  Chou et al.
6,636,790 B1 *  10/2003  Lightner ............. G01M 15/102
                                                         701/31.4
(Continued)

FOREIGN PATENT DOCUMENTS

DE    102 57 030 A1    12/2003
DE    103 13 467 A1    10/2004
(Continued)

*Primary Examiner* — Jonathan M Dager
(74) *Attorney, Agent, or Firm* — Ware, Fressola, Maguire & Barber LLP

(57) ABSTRACT

The invention relates to a method for vehicle communication via a vehicle-implemented vehicle diagnosis system (3), to which a vehicle diagnosis interface (10) having an interface connector (11), an interface module (12) and an air interface (13) is connected, and in which: vehicle diagnosis data (I) from a vehicle are transmitted from the vehicle-implemented vehicle diagnosis system (3) of the vehicle to a mobile user communication terminal (20) via the air interface, and the mobile user communication terminal (20) is associated with the vehicle and also the vehicle diagnosis data (I) are transmitted from the mobile user communication terminal (20) to a data network system (40) via a communication network (30), wherein the data network system (40) makes the vehicle diagnosis data (I) available to the mobile user communication terminal (20) again.

30 Claims, 9 Drawing Sheets

(51) Int. Cl.
*G07C 5/00* (2006.01)
*G08G 1/16* (2006.01)
*G08G 1/00* (2006.01)

(56) References Cited

U.S. PATENT DOCUMENTS

| | | | | |
|---|---|---|---|---|
| 7,155,321 B2* | 12/2006 | Bromley | ............... | G07C 5/0808 340/989 |
| 7,835,691 B2* | 11/2010 | Groskreutz | ............ | H04H 20/57 370/316 |
| 7,904,219 B1 | 3/2011 | Lowrey et al. | | |
| 8,140,358 B1* | 3/2012 | Ling | ................ | G06Q 40/08 340/439 |
| 8,626,568 B2* | 1/2014 | Warkentin | ......... | G06Q 10/0639 705/7.38 |
| 9,198,206 B2* | 11/2015 | Li | ........................ | H04W 76/02 |
| 2002/0181405 A1* | 12/2002 | Ying | ................... | G05B 15/02 370/245 |
| 2003/0083079 A1* | 5/2003 | Clark | ................ | G08G 1/096716 455/466 |
| 2003/0163587 A1* | 8/2003 | Knight | ................ | B60R 16/0315 709/249 |
| 2003/0195676 A1* | 10/2003 | Kelly | ..................... | G07C 5/008 701/31.4 |
| 2003/0228005 A1* | 12/2003 | Melick | ................. | H04B 1/7172 379/93.01 |
| 2004/0157650 A1* | 8/2004 | Wissinger | ............. | G07C 5/008 455/569.2 |
| 2004/0176935 A1* | 9/2004 | Sproule | ................. | G07C 5/008 703/8 |
| 2005/0038581 A1* | 2/2005 | Kapolka | ................ | G07C 5/008 701/31.4 |
| 2005/0065678 A1* | 3/2005 | Smith | .................... | G07C 5/008 701/31.4 |
| 2005/0065679 A1* | 3/2005 | Kawauchi | ............... | G07C 5/085 701/33.4 |
| 2005/0154500 A1* | 7/2005 | Sonnenrein | .......... | H04L 67/025 701/1 |
| 2005/0165639 A1* | 7/2005 | Ross | ................. | G06Q 30/0267 705/14.64 |
| 2005/0203673 A1* | 9/2005 | El-Hajj | .................. | G07C 5/008 701/1 |
| 2006/0022842 A1* | 2/2006 | Zoladek | ................ | G07C 5/008 340/870.07 |
| 2006/0247832 A1* | 11/2006 | Taki | ....................... | G06Q 10/02 701/31.4 |
| 2007/0035632 A1* | 2/2007 | Silvernail | ............ | G07C 5/0891 348/211.3 |
| 2007/0038338 A1* | 2/2007 | Larschan | ............... | G07C 5/008 701/2 |
| 2007/0038351 A1* | 2/2007 | Larschan | ............... | G06Q 10/06 701/33.4 |
| 2007/0038352 A1* | 2/2007 | Larschan | ............... | G06Q 10/06 701/33.4 |
| 2007/0038353 A1* | 2/2007 | Larschan | ............... | G07C 5/085 701/33.4 |
| 2007/0050108 A1* | 3/2007 | Larschan | ............... | G07C 5/085 701/33.4 |
| 2008/0015748 A1* | 1/2008 | Nagy | .................... | G07C 5/008 701/31.4 |
| 2008/0147265 A1 | 6/2008 | Breed | | |
| 2009/0135845 A1* | 5/2009 | Husain | ............... | H04M 3/5183 370/420 |
| 2010/0174576 A1* | 7/2010 | Naylor | .................. | G06Q 10/04 701/31.4 |
| 2010/0210254 A1* | 8/2010 | Kelly | .................... | G07C 5/008 455/418 |
| 2010/0256861 A1* | 10/2010 | Hodges | ............... | B60R 16/0234 701/31.4 |
| 2010/0256864 A1* | 10/2010 | Ying | ................... | H04L 12/2697 701/31.4 |
| 2011/0009107 A1* | 1/2011 | Guba | ...................... | G08G 1/20 455/418 |
| 2011/0125363 A1* | 5/2011 | Blumer | ................. | G06Q 30/06 701/31.4 |
| 2011/0276218 A1* | 11/2011 | Dwan | .................... | G07C 5/008 701/29.5 |
| 2011/0294466 A1* | 12/2011 | Tang | .................... | H04W 12/08 455/411 |
| 2012/0041638 A1* | 2/2012 | Johnson | ................ | G07C 5/008 701/33.1 |
| 2012/0044052 A1* | 2/2012 | Davis | .................... | G07C 5/0825 340/6.1 |
| 2012/0046807 A1* | 2/2012 | Ruther | ................... | B60R 25/24 701/2 |
| 2012/0046825 A1* | 2/2012 | Ruther | ................... | G07C 5/008 701/31.5 |
| 2012/0047291 A1* | 2/2012 | Davis | .................... | G07C 5/0825 710/14 |
| 2012/0239223 A1* | 9/2012 | Schwarz | ............... | G06Q 30/06 701/2 |
| 2012/0313771 A1* | 12/2012 | Wittliff, III | ......... | G07C 5/0808 340/441 |
| 2013/0282227 A1* | 10/2013 | Chen | ................... | G07C 5/0808 701/31.5 |
| 2013/0282228 A1* | 10/2013 | Cawse | .................. | G07C 5/085 701/32.2 |
| 2013/0289873 A1* | 10/2013 | Mitchell | ................ | G06F 17/00 701/482 |
| 2014/0058618 A1* | 2/2014 | Rude | ....................... | G06F 17/00 701/31.4 |
| 2014/0189814 A1* | 7/2014 | Marten | ................. | G07C 5/008 726/4 |
| 2014/0195102 A1* | 7/2014 | Nathanson | ........... | G07C 5/0808 701/31.4 |

FOREIGN PATENT DOCUMENTS

| | | |
|---|---|---|
| DE | 10 2006 009098 A1 | 8/2007 |
| DE | 10 2009 003 326 A1 | 8/2009 |
| EP | 2 159 122 A2 | 3/2010 |
| WO | 03/027629 A1 | 4/2003 |
| WO | 2011/035880 A1 | 3/2011 |

* cited by examiner

METHOD FOR VEHICLE COMMUNICATION BY MEANS OF A VEHICLE-IMPLEMENTED VEHICLE DIAGNOSTIC SYSTEM, VEHICLE DIAGNOSTIC INTERFACE, INTERACE MODULE, USER COMMUNICATION TERMINAL, DATA CONNECTION SYSTEM, AND DIAGNOSTIC AND CONTROL NETWORK FOR A PLURALITY OF VEHICLES

CROSS REFERENCE TO RELATED APPLICATIONS

This application is the U.S. National Stage of International Application Number PCT/EP2012/059920 filed on May 25, 2012 which application claims priority under 35 USC §119 to German Patent Application No. 10 2011 076638.3 filed on May 27, 2011. Both applications are hereby incorporated by reference in their entirety.

TECHNICAL FIELD

The invention relates to a method for vehicle communication by means of a system, having a vehicle, via a vehicle diagnosis interface. The invention also relates to an interface module for a vehicle diagnosis interface and also to the vehicle diagnosis interface. In addition the invention relates to a user communication terminal, a data network system and a diagnosis and control network for a multiplicity of vehicles.

BACKGROUND OF THE INVENTION

Vehicle diagnosis systems that are limited to vehicle diagnosis, such as an onboard diagnosis system (OBD system), are known. During driving, all systems, particularly those that influence exhaust gases, are monitored, and also additionally further important controllers such as temperature controllers or the like, the data of which are accessible through their software. Errors that occur are indicated to the driver by means of a warning light and are permanently stored in the respective controller. Error reports can then be requested later by a technical workshop using standardized interfaces or suchlike vehicle diagnosis interfaces.

What are known as OBD diagnosis interfaces are also known that—as can be gleaned from the website www.obd-2.de, for example—can use a Bluetooth or suchlike air interface to couple to the vehicle diagnosis interface in order to make vehicle diagnosis data available for a smartphone, Android or pocket PC or suchlike mobile user communication terminal. Such devices dispense with the need to go to the workshop, but are limited to making only the vehicle diagnosis data available to the vehicle driver and user of the mobile user communication terminal. A problem with such devices is simply the flexibility with regard to usability with reference to the vehicle diagnosis interface. Although the errors or other codes of the vehicle diagnosis data are standardized (ISO Standard 15031-6), the protocol for transmitting them is not. Therefore, it has also been necessary to date for a separate OBD interface, separate from mobile user communication terminals, still to be limited to a particular interpreter chip (e.g. ELM327).

US 2010/0210254 A1 discloses a system that restricts the use of a mobile user communication terminal, coupled to a vehicle diagnosis interface in this manner, for particular driving situations for the vehicle. Thus a piece of blocking software may be designed to receive vehicle diagnosis data and to block the operation of at least one communication function of the mobile user communication terminal on the basis of the received vehicle diagnosis data. This may be an increased speed or a switching process or suchlike result of a vehicle diagnosis, for example.

US 2010/0256861 discloses a system for monitoring the integrity status of a vehicle using a vehicle monitoring computer system and a mobile telephone that can receive a piece of diagnostic information relating to a vehicle from a vehicle. This is also intended to be used to automatically determine a severity status for vehicle states on the basis of predefined severity status values, and if the severity status exceeds a predefined severity threshold value for any of the vehicle states then a text message is intended to be automatically transmitted to the mobile telephone. In this case, a vehicle identification number (FIN) or an identification for the mobile telephone (PIN) is able to be implemented in a suitable data packet. The mobile telephone in the system is wirelessly connected to the vehicle or to its environment and can communicate with the environment, for example, via a communication network or an Internet, in order to transmit vehicle diagnosis data to the network. This allows the data to be evaluated, whether by the vehicle keeper and mobile telephone user from an external center or whether by a control center belonging to third parties. The mobile telephone and the CPU of the vehicle controller can enter a paired state using Bluetooth in this case without the need for user intervention, which means the vehicle diagnosis data are transmitted automatically.

The aforementioned diagnosis connections coupled to a vehicle-implemented vehicle diagnosis system by air interface are limited to the evaluation of vehicle diagnosis data that, in this respect, can be transmitted in an uplink—from the vehicle-implemented vehicle diagnosis system to the mobile user communication terminal—only unidirectionally. The systems are limited either to restricting the communication function of the mobile user communication terminal as a result of the vehicle diagnosis data, as in US 2010/0210254 A1, or else to transmitting a message to the mobile user communication terminal merely for the purpose of informing the user of the mobile user communication terminal, as in US 2010/0256861, who is not necessarily the vehicle driver. Such systems are limited to merely rendering the pure vehicle diagnosis data transparently visible to a mobile telephone user and possibly to dispensing with the need to go to the workshop.

US 2008/0015748 A1 discloses a system and method for representing and analyzing vehicle diagnosis data from a vehicle diagnosis interface that has, inter alia, an air interface coupling to a mobile user communication terminal, which means that the vehicle diagnosis data can be transmitted wirelessly. In this case, in addition to the vehicle diagnosis data, geographical position data are also transmitted from the vehicle diagnosis interface to the mobile user communication terminal or a navigation device and forwarded to an Internet server or a Wide Area Network (WAN). Thus, the data can be inspected by end users or software applications can gain access to such data in a manner automated by a program. Such a software application may be coupled to the mobile user communication terminal only from a network in dynamically configurable fashion. The vehicle diagnosis data can be made available to an authorized user, namely a recovery service.

This system is also limited to a unidirectional connection within the context of an uplink—for a vehicle-implemented vehicle diagnosis system to the mobile user communication terminal—in order to spur on an action from external authorized users on the basis of an analysis that uses the vehicle diagnosis data.

SUMMARY OF THE INVENTION

It is desirable for such aforementioned diagnosis systems and diagnosis networks extended by means of a vehicle-implemented vehicle diagnosis system—which are ultimately based only on vehicle diagnosis data—to be substantially improved, particularly in terms of their functionality and their data basis.

This is the starting point for the invention, the object of which is to specify a method and an apparatus—particularly an interface module, a vehicle diagnosis interface and a diagnosis network—that is improved beyond extended diagnosis of vehicle data as cited at the outset. In particular, the aim is for a functionality of the method and of the apparatus to be substantially improved. In particular, the aim is for the data basis of such a method and of such an apparatus to be substantially improved.

The object concerning the method is achieved by a method of the type stated at the outset in which the features of claim 1 are provided.

Preferably, but not necessarily, the mobile user communication terminal is associated with the vehicle, in particular is known to the vehicle diagnosis system of the vehicle or at least to the vehicle diagnosis interface. In principle, the mobile user communication terminal does not initially need to be known to the vehicle, such as an automobile. Preferably, however, the vehicle and the mobile user communication terminal are known to the vehicle diagnosis interface—also called an adapter. Also preferably, but not necessarily, the adapter is known to the mobile user communication terminal and to an application. All known devices are stored in a database of the data network system and reported to the system. Preferably, the mobile user communication terminal is associated with the vehicle by means of the interface module; in particular i.e. in the connected case by means of the vehicle diagnosis interface, with an interface connector, the interface module and an air interface. By way of example, the air interface can be used to set up a fixed wireless communication link (pairing) between the mobile user communication terminal and an interface (e.g. an OBD or SAE interface) of the vehicle diagnosis system. It is also possible for vehicle diagnosis data from a vehicle to be transmitted from the vehicle-implemented vehicle diagnosis system of the vehicle via the air interface to a preferably but not necessarily predeterminedly stipulated number of multiple mobile user communication terminals; by way of example these can also be stipulated on the basis of situation by a vehicle driver or other user. It is also possible to send to an unknown number that is not associated with the vehicle. In principle, it is not necessary for the associated mobile user communication terminal(s) to be located in the vehicle. However, it has been found to be advantageous for the purpose of monitoring, diagnosis and communication in respect of the vehicle functions if an associated mobile user communication terminal is located in the vehicle. In particular, the method is found to be particularly effective when information available via the user communication terminal is available from the vehicle driver or a vehicle occupant, particularly just a single user communication terminal, preferably belonging to the vehicle driver, in addition to the cockpit indicators in the vehicle.

The invention provides that
the vehicle diagnosis data are augmented with supplementary data obtained outside the vehicle diagnosis system,
a relevance of the supplementary data to the immediate driving situation of the vehicle is predetermined in an instruction specification.

In respect of the apparatus, the object is achieved by a diagnosis and control network according to claim 22. A user communication terminal and/or the data network system are of appropriate design to augment the vehicle diagnosis data with supplementary data obtained outside the vehicle diagnosis system.

The vehicle diagnosis data and the supplementary data obtained outside the vehicle diagnosis system are associated with one another by means of the filter action determined for the immediate driving situation of the vehicle in an instruction specification. In principle, the vehicle diagnosis data and the supplementary data obtained outside the vehicle diagnosis system can be communicated independently of one another and/or can be communicated for different components of a diagnosis and control network. It has also been found to be advantageous to communicate the vehicle diagnosis data and the supplementary data obtained outside the vehicle diagnosis system in a data packet, particularly in a data packet that fully or partly contains the vehicle diagnosis data and supplementary data associated with one another by means of the instruction specification.

In particular, in a first variant of a development, provision may be made for the vehicle diagnosis data and the supplementary data to be transmitted back as far as to the vehicle diagnosis interface. In particular, the vehicle diagnosis data and the supplementary data can be transmitted back as far as to the vehicle-implemented vehicle diagnosis system. In a second variant of a development, provision may be made for the vehicle diagnosis data and the supplementary data to be transmitted back only as far as to the mobile user communication terminal.

By way of example, the instruction specification, which can preferably be created in an open programming environment, may be a software application or another interpreter that can be used without restriction by a user of the mobile user communication terminal or a user of the communication network. In particular, a preferably open programming environment contains an interpreter that is compatible with an operating system of the mobile user communication terminal. By way of example, this may be an interpreter version for an iPad, an Android, a Blackberry (RIM) or a Windows device. By way of example, the open programming environment may be compatible with operating systems such as iOS, WINDOWSmobile, BADA, RIM OS or the like. In particular, a communication network is intended to be understood to mean the Internet or a mobile communication network and also possibly a WAN (Wide Area Network—network that extends over long distances and is bounded neither in terms of geographical range nor in terms of the number of computers) or LAN (Local Area Network—network (particularly wireless) that is locally/geographically limited (approximately 500 m)). It is also possible to use Personal Area Networks (PAN) or what are known as WiFi networks and what are known as PicoNets, which can be set up and cleared down on an ad hoc basis by small devices such as PDAs or mobile telephones; in particular, wireless networks such as WLAN, WPAN, WiFi networks are advantageous.

The invention also presents an interface module of claim 18. The concept of the invention also comprises an interface connector for holding the interface module.

The invention also presents a vehicle diagnosis interface of claim 19. In particular, the interface connector is an OBD connector or an SAE connector. In particular, the interface connector is designed for an RJ plug connection and/or for coupling to an ETHERNET of the vehicle diagnosis system.

The concept of the invention also comprises a user communication device of claim 20. The concept of the invention also presents a data network system of claim 21.

In the case of an interface module, the logic is designed to implement an instruction specification that is created in a preferably open programming environment and that is compatible with the mobile user communication terminal, wherein the instruction specification is designed to predetermine relevant supplementary data for the immediate driving situation of the vehicle. In particular, the logic of the interface module is designed to execute a software module with an instruction protocol (application protocol interface, API) for implementing an instruction specification.

In the case of the interface module, the memory is designed to store the vehicle diagnosis data and/or the relevant supplementary data, wherein the interface module can be connected to or integrates an interface connector and/or an air interface of the vehicle diagnosis interface.

In other words, the vehicle diagnosis data and the supplementary data can be stored on the interface module of the vehicle diagnosis interface and can be communicated bidirectionally, i.e. in an uplink to the mobile user communication terminal and a downlink from the mobile user communication terminal, via the interface module with a vehicle controller and an external environment. Preferably, the vehicle diagnosis data and the supplementary data are stored only on the interface module, which means that the interface of the vehicle diagnosis interface, which interface exists in the form of a connector per se, does not need to be altered as such in principle. Nevertheless, both the supplementary data and the vehicle diagnosis data enhanced with the supplementary data are therefore available—via the interface module—on the vehicle diagnosis interface again, that is to say are available to the vehicle-implemented vehicle diagnosis system and also to the vehicle controller.

Essential aspects of the concept of the invention therefore go beyond direct or indirectly extended mere vehicle diagnosis just on the basis of vehicle diagnosis data.

In relation to a first aspect, the invention has recognized that vehicle diagnosis data can in various respects also be augmented with supplementary data obtained outside the vehicle diagnosis system. As recognized by the invention, the database of the diagnosis and control network or of the method for vehicle diagnosis is substantially extended and can be used in order to allow not just extended vehicle diagnosis but furthermore to take on a specific control function that is advantageous to the vehicle keeper.

To this end, a second aspect of a particularly preferred development of the invention provides that the vehicle diagnosis data and the supplementary data are transmitted back as far as to the vehicle diagnosis interface. The connection between a mobile user communication terminal and the vehicle diagnosis interface is therefore preferably bidirectional in terms of the data transmission. Vehicle diagnosis data can be transmitted (within the context of an uplink) from the vehicle diagnosis interface to the mobile user communication terminal. Furthermore, not just these vehicle diagnosis data but also particularly vehicle diagnosis data enhanced with suitable supplementary data can be transmitted from the mobile user communication terminal (within the context of a downlink) to the vehicle diagnosis interface, however. With particular preference, the vehicle diagnosis data and the supplementary data can be transmitted back as far as to the vehicle-implemented vehicle diagnosis system. Particularly preferably, this provides the option of intervention in a vehicle control function on the basis of the supplementary data too. The vehicle diagnosis system and/or a vehicle controller has/have access to the supplementary data too and can introduce measures of vehicle control that are based thereon if necessary. The concept of the invention is not just limited to pure vehicle diagnosis but also goes beyond this. The preferred concept is particularly directed at extended vehicle control using the vehicle diagnosis data and also supplementary data that are relevant thereto, that are obtained externally to the vehicle diagnosis system and are made available to the vehicle to controller via the mobile user communication terminal, inter alia.

According to the concept of the invention, the relevance of the supplementary data to the immediate driving situation of the vehicle is predetermined in an instruction specification.

Advantageous developments of the invention can be found in the subclaims and specifically provide advantageous options for implementing the concept explained above within the context of the statement of the problem and also in respect of further advantages.

Within the context of one development of the invention, in an aspect that is an alternative to the second aspect, the vehicle diagnosis data and the supplementary data can be transmitted back only as far as to the mobile user communication terminal. Hence, it is possible to relieve the load on an interface module and for the vehicle diagnosis data to be presented completely on a surface of the user communication terminal in a manner extended by the supplementary data.

Preferably, data pertaining to the static data network system are transmitted via a long range communication network and/or data pertaining to the mobile vehicle diagnosis interface from the vehicle are preferably transmitted via a shorter range communication network. Preferably, it is possible for vehicle diagnosis data and/or supplementary data to be transmitted between the mobile user communication terminal and/or between the vehicle diagnosis interface, on the one hand, and the data network system, on the other hand, via a communication network, particularly an Internet. In addition or alternatively, it is possible for vehicle diagnosis data and/or supplementary data to be transmitted between the mobile user communication terminal, on the one hand, and the vehicle diagnosis interface, on the other hand, via a communication network, particularly a local area network, such as a WiFi or WLAN network. It is also possible to use personal area networks (PAN) or what are known as WiFi networks and what are known as PicoNets, which can be set up and cleared down on an ad hoc basis by small devices such as PDAs or mobile telephones; in particular wireless networks such as WLAN, WPAN, WiFi networks are advantageous. Having said that, data can be transmitted between the mobile user communication terminal, on the one hand, and the vehicle diagnosis interface, on the other hand, via a long range communication network too.

A suitable communication network with a long range is particularly a cellular communication network for mobile communication, e.g. on the basis of a GPRS, UMTS or LTE technology or suchlike 2G, 3G standard, etc.

Preferably, data enhancement and/or buffering can take place at any communication node. In particular, supplementary data and/or data buffering of at least the supplementary data, particularly also of the vehicle diagnosis data, can take place on at least one of the components that are selected from the group consisting of: vehicle diagnosis interface, user communication terminal, data network system, proprietary data systems and open data systems. In particular, the interface module and/or the vehicle diagnosis interface is/are designed to perform data enhancement. Preferably, the supplementary data from the interface module comprise at least: time of day and date; in particular also comprise location data, preferably obtained from a communication network, a global positioning system (GPS) or the like, location time data, particularly in the form of uninfluenced supplementary data that are in the form of substantiation data for verifying a vehicle time and/or location. In this regard, it has been found to be advantageous to provide a real time clock, particularly in the interface module.

The interface module is particularly preferably provided with a powerful logic unit; e.g. that of a smartphone equivalently or similarly and the interface module preferably has an adequate memory, e.g. a few gigabytes of an EPROM or of a persistent memory. The memory is used, inter alia, for storing matrices or suchlike information masks for addressing the interface to the vehicle diagnosis system. The memory is preferably also used for storing vehicle diagnosis data and the supplementary data.

As recognized by one particularly preferred development, the instruction specification is particularly advantageously able to be created in an open programming environment and is compatible with the mobile user communication terminal. This firstly overcomes previous compatibility problems regarding the transmission protocol. Secondly, any software application or suchlike computer program product that implements the instruction specification is comparatively simple to create in the open programming environment. By way of example, a user of the mobile user communication terminal can use comparatively simple programming instructions to create an instruction specification individually customized to him on a mobile user communication terminal.

The logic unit of a vehicle diagnosis interface is of appropriate design to implement such a simple instruction specification. The memory of an interface module is of appropriate design to store vehicle diagnosis data and/or relevant supplementary data and to hold them available for a vehicle diagnosis system and/or vehicle control.

Advantageously, the vehicle diagnosis data are ascertained and enhanced in real time and continuously, which allows particularly good support for the vehicle driver in an immediate journey situation. In the broader sense, continuous is intended to be understood to mean any process that works on ascertaining and enhancing the vehicle diagnosis data in a manner appropriate to the situation. When a data connection has been interrupted owing to the situation, a continuous process may provide for buffer storage of all or relevant data, for example, so that an event or important events is/are not lost. Such a process runs in real time when an interrupt to the data update is sufficiently quick in comparison with a change in the driving situation. An interrupt may be designed to have a fundamentally short clock rate in the sub-Hz range or else very much above it, particularly in the range between 100 Hz and 10 Hz, as are customary for communication networks. Nevertheless, an interrupt may also be characterized by very much longer cycles of minutes or else hours if the driving situation so allows.

The supplementary data are advantageously available from the communication network and/or the data network system. The supplementary data can advantageously be used both by the mobile user communication terminal and/or by the communication network and/or by the data network system and/or from an external sensor system in order to enhance the pure vehicle diagnosis data. The data network system advantageously comprises a database and a number of proprietary data systems, open data systems or state-owned data systems that are connected thereto.

Particularly preferably, the supplementary data can be obtained from supplementary modules of the mobile user communication terminal. In particular, these are modules implemented in the user communication terminal. Alternatively, it is possible to use modules, switches, operator control inputs or a sensor system that are available externally to the user communication terminal. The mobile user communication terminal particularly has supplementary modules that are selected from but not limited to the group of modules consisting of: GPS, clock, motion module, gyroscope, camera, video camera, microphone, loudspeaker, light area. It is thus possible for supplementary data such as position, time of day, motion state, local close environment, acoustic close environment, temperature, humidity or the like to be captured comparatively easily particularly using the user communication terminal and, depending on the relevance to an immediate driving situation, to be used by an instruction specification in order to enhance the vehicle diagnosis data. It is also possible for supplementary data from the close environment of the vehicle, such as visual and/or acoustic reproduction of the close environment, particularly pressure and temperature and humidity values and also other atmospheric values, to be made available by a suitable sensor system externally and in addition to a standard vehicle sensor system. Additionally, it is also possible for motion and/or acceleration values to be made available. Close environment initially means particularly the vehicle interior and the immediate close environment of the vehicle. In particular, the close environment may alternatively comprise a further close environment, as prescribed by the range of a LAN and/or the closer traffic environment, for example—preferably up to at least 500 m. Supplementary data may also comprise user inputs or the like that are input using an MMI (man machine interface) or another suitable interface between user and a device, particularly the user communication terminal, smartphone and/or the data network system. Further examples of a suitable MMI that is suitable particularly for displaying vehicle diagnosis data with supplementary data obtained outside the vehicle diagnosis system is a head-up display (HUD), for example, that is to say a display panel in the direction of view, in the case of which the information important to the user can be projected into his field of vision, or what are known as smart glasses (projection glass), onto which information from the Internet, for example, can be loaded into one's own field of vision and which can be controlled using spoken commands or gestures, for example.

Within the context of what is known as "car-2-X" communication, the supplementary data can come from an external sensor system and can be transmitted directly to the vehicle diagnosis interface. In particular, the supplementary data can then be transmitted to the user communication terminal and/or can be transmitted directly to the user communication terminal. Advantageously, the user communication terminal is used as a controller in order to monitor an external sensor system at the same time in addition to a vehicle sensor system or to enhance appropriate diagnosis data with supplementary data. Supplementary data can also be provided by RSE (road side equipment) such as traffic lights, tollbooths, checkpoints for fine particles, etc.

Within the context of what is known as "car-2-car" communication, one particularly preferred development provides for vehicle diagnosis data from a vehicle to be transmitted by radio broadcast from the vehicle-implemented vehicle diagnosis system of the vehicle via the air interface to an air interface of another vehicle and for vehicle diagnosis data in the other vehicle to be transmitted to a mobile user communication terminal and possibly a data network system that is associated with the other vehicle. Transmission can also take place via WLAN or a WiFi interface. This can be used for advanced warning of accidents, for example, by virtue of an interface module of the first vehicle transmitting critical operating states of the first vehicle (e.g. full braking) to other vehicles within the context of a broadcast. The vehicle drivers of the other vehicles thus possibly have the opportunity to react early or else to receive a proposal—explained further below—for a vehicle control function. In other words, the supplementary data may also comprise data from other vehicles that are able to be used to enhance the diagnosis data from the diagnosis system of a vehicle.

In particular, a packet comprising vehicle diagnosis data and supplementary data for a particular immediate driving situation can be used in order to make a verifiable proposal for a vehicle control function. The proposal for a vehicle control function can be presented to the vehicle keeper via the vehicle controller for the purpose of verification. In particular, however, it has also been found to be advantageous that the vehicle control function can be changed without driver verification. This becomes possible particularly with suitable verification of the vehicle and/or of the mobile user communication terminal and/or of the vehicle diagnosis interface. By way of example, the verification can take place using a vehicle identification number (FIN) and/or an identification number from the mobile user communication terminal or from the user (PIN, SIM No., device number or agreement number or telephone number of the mobile customer) or a connector PIN from the interface connector, for example an OBD or SAE connector or an RJ plug connection for coupling to an Ethernet of the vehicle diagnosis system. In particular, such verification can also be set up on a permanent basis. By way of example, this can be achieved by a practically fixed, nondetachable coupling between the interface connector and the interface module; for example by storing a key that uses the numbers of the verification in a permanent memory of the interface connector and in the interface module, for example an EPROM or the like.

An instruction specification suitable for the immediate driving situation can advantageously be created within the context of a programmed software application or may contain such an application. The instruction specification may be designed for different functions, particularly vehicle control functions. In this case, according to the concept, the instruction specification advantageously provides not only uplink transmission and/or ascertainment of vehicle diagnosis data but also, advantageously, additionally downlink transmission and/or ascertainment of data, namely particularly from a packet comprising vehicle diagnosis data and supplementary data. Examples of such instruction specifications, inter alia, are explained in the description of the drawings. Vehicle control functions are not limited to the group of functions consisting of:
vehicle control proposal and/or repair,
accident examination and notification,
journey route stipulation and analysis,
journey route and/or driving behavior cost balancing,
vehicle passport data update and storage, driving behavior control and
analysis, particularly in respect of economical and/or efficient driving behavior.

The respectively first-mentioned vehicle control function (vehicle control proposal, journey route stipulation, vehicle passport data update, driving behavior control) respectively relates to the downlink transmission of vehicle diagnosis data and supplementary data in a packet that matches the immediate driving situation of the vehicle. By way of example, a vehicle control proposal and/or repair—for example loading a piece of emergency software or removing an electronic lock—can temporarily render a vehicle in an emergency situation fit for the journey to the next garage.

Other options include the provision of driver information, fleet information, advertising, information relating to a parking situation, information relating to pending toll or other road charges, trip or penalty charges, information relating to current exhaust values and/or environmental zones, information and/or warnings about pre-accident situations and/or post-accident situations, information relating to vehicle error codes, vehicle history, driver profile and/or vehicle insurances or insurance values, information relating to current tank contents and/or reachable and/or nearby filling stations, generally vehicle-to-vehicle information (N-2-N) or vehicle-to-others information (car-2-X), information relating to preferred or practiced personal traffic routes and/or transport routes, for example. It is also possible to implement what is known as an MLM (mobile logistics mash-up), i.e. an ad-hoc combination of drivers and vehicles eager for transport; a CPT (customer product trace), i.e. end-to-end life cycle considerations for vehicles and their drivers; and a DriveRecorder, similar to a black box from aircraft.

It has been found that the concept presented here or one of the developments thereof allows services from third-party providers to be oriented considerably more efficiently and more specifically to a vehicle equipped with the presented concept. By way of example, insurance services can be provided in a manner personalized to a particular profile, particularly to a profile that is characterized by a particular driving behavior. Key data that are essential for providing an insurance service, such as a location stamp and a time stamp for particular events—for example an accident or the like—can be provided automatically and safely. Further criteria may relate to the travel time and driving behavior (stop & go, high speed, etc.) or to weather and vacation periods.

Services from filling stations may be available at optimum cost for the vehicle driver and during the route planning—particularly during the interactive or automatic route planning in the course of the journey. It is also possible for current choices of filling stations, based on a vehicle position and a tank reserve status, to be provided or used more efficiently.

Emergency services, such as rescue services or police services, can be made available by automated location and time information, possibly augmented by additional information relating to the severity and extent of the accident. By way of example, signals relating to the triggering of an airbag, changes in acceleration values or even audio and video data can be available directly. By way of example, an audio & video link can be set up between mobile telephone and "rescue station".

Access to the vehicle by the authorities can be better identified and taken into account by the vehicle keeper, and conversely it is possible for access by the authorities to be organized more effectively. By way of example, it is thus possible for trip and road charges to be collected on the basis of automated recording of road use—for example on the basis of position and/or on the basis of the recorded distance covered. Thus, it is also possible for charges for vehicle use to be measured in any case in accordance with existing $CO_2$ emission guidelines, on the basis of consumption, or the like. The observance of particulate matter zones or congestion charges can be checked. Executive bodies, such as police services or the like, may have remote access to particular information within the framework of legal requirements when needed. This allows an increase in road safety at particularly hazardous locations.

Original manufacturers, but also automobile clubs or parties with an interest in vehicle demographics, for example, can track a vehicle's use over its life. It is possible to implement an "extended" test phase through enhanced observation of error codes following market introduction or early-phase recognition of liability problems. It is possible for a software update or the like to be performed remotely via the vehicle diagnosis interface during control or regulatory intervention in the vehicle control device within the context of the concept described.

In the case of automobile clubs, empirical values relating to error messages or statistics about malfunction or technical lapses in a vehicle or in a vehicle type can be collected. It is possible to collect higher empirical values for the repair of a vehicle or of a vehicle type; this may be the basis for an, in particular, individual, repair instruction for a vehicle type or else for a specific vehicle that updates itself online and in the course of individual use of a vehicle on the basis of the data collection by means of the vehicle communication described here.

Vehicle control assistants can be provided, such as personalized autopilot functions or control functions that are attuned to particular subjective driving behaviors. By way of example, driver-specific excessive acceleration behavior and excessive braking behavior can be deregulated or buffered within the context of mobile assisted vehicle control and/or piloting. By way of example, this can be used in order to apply a personalized and hence particularly effective saving program for fuel use or for fuel consumption.

When a vehicle is re-sold, it is possible for value-maintaining characteristic data pertaining to treatment and driving behavior, for example, to be documented and assessed as part of a vehicle passport. This can be used by the re-seller in order to obtain a realistic price for his vehicle. Conversely, a buyer is provided with reliable information, in particular information that may be unforgeable or certified. During garage visits, such information can be used to facilitate an error search or to attune repair cycles to the aforesaid characteristic data. It is also possible to document the garage visits, including lists of defects and repairs.

Particular user communities can operate in an improved manner with the data that are made available. By way of example, mobile logistics networks can be formed on an ad hoc basis, for example, in order to avoid empty runs in transport companies when they are known within the context of updated data availability. It is also possible for ride opportunities or the like to be made more flexible and more effective within the context of networks.

Within the context of one particularly preferred developing concept, it has been found to be advantageous for the vehicle to be able to be automatically authenticated during vehicle communication with a center, particularly one that is independent of vehicles. In particular, the authentication may, in that case, be based on an authorization code that is automatically transmitted during the vehicle communication. It is thus possible to automate access authorizations for vehicle-associated or vehicle independent centers—such as services or locations—and to handle underlying services in an automated fashion; the developing concept forms an advantageous basis for a reliability check on the party seeking authorization. A preferably vehicle-independent center preferably comprises one or more centers that is/are selected from the group comprising: the user communication terminal and/or the data network system, a service provider, a limited-access local area, the vehicle diagnosis system of said vehicle and/or of another vehicle, a user communication terminal that is associated with said vehicle and/or with another vehicle. It is thus possible for the authorization code to be compared with a stored code in order to authenticate the vehicle within the context of an authorization check, for example. Preferably, the stored code can be stored in the data network system and the vehicle-independent center can set up a check connection to the data network system within the context of the authorization check for authenticating the vehicle.

Preferably, an authorization code is based on a combination of at least two codes; this makes the authentication particularly reliable. The at least two codes are preferably selected from the group comprising: a vehicle code that is used for vehicle identification; a communication code that relates to the mobile user communication terminal; an interface code that is used for interface identification. It is also possible for a user code/ID/hash from a user database of the data network system, into which database the user can enter his personal data, to be used as a component. These codes particularly preferably take into account a usable designation for the core components of the concept described.

A vehicle code used for vehicle identification is preferably a vehicle registration character string and/or number and/or a vehicle identification character string and/or number (FIN). A communication code that relates to the mobile user communication terminal is preferably a device character string and/or number for the user communication terminal, a telephone character string and/or number associated with the user communication terminal or a SIM character string and/or number, associated—by means of an inserted SIM card—with the user communication terminal, from the SIM card. An interface code that is used for interface to identification is preferably a character string and/or number associated with the interface module.

It has also been found to be preferred for the vehicle diagnosis data and/or the supplementary data to be encrypted, particularly to be encrypted using an unchangedly fixed key, preferably by means of an identification number from the vehicle and/or from the mobile user communication terminal and/or from the vehicle diagnosis interface as a key.

Exemplary embodiments of the invention are now described below with reference to the drawing. This is not necessarily meant to present the exemplary embodiments to scale, but rather the drawing—where useful for explanatory purposes—is shown in schematic and/or slightly distorted form. For additions to the teaching that can be identified directly from the drawing, reference is made to the relevant prior art. In this case, it should be taken into account that diverse modifications and changes relating to the form and the detail of an embodiment can be made without departing from the general idea of the invention. The features of the invention disclosed in the description, in the drawing and in the claims may be essential to the development of the invention either individually or in any combination. In addition, the scope of the invention covers all combinations of at least two of the features disclosed in the description, the drawing and/or the claims. The general idea of the invention is not limited to the exact form or the detail of the preferred embodiment shown and described below or limited to subject matter that would be restricted in comparison with the subject matter claimed in the claims. In the case of specified dimensional ranges, values within the cited limits are also intended to be disclosed as limit values and able to be used and demanded as desired. For the sake of simplicity, the same reference symbols are used below for identical or similar portions or portions with an identical or similar function.

BRIEF DESCRIPTION OF THE DRAWINGS

Further advantages, features and details of the invention emerge from the description below of the preferred exemplary embodiments and from the drawings, in which, specifically:

FIG. 2 shows a number of symbolically presented vehicle control functions that can each be implemented by means of an instruction specification, suitably comprising a program software application, in an open programming environment, for example on a mobile user communication terminal, such as a smartphone or the like;

Figure 8:
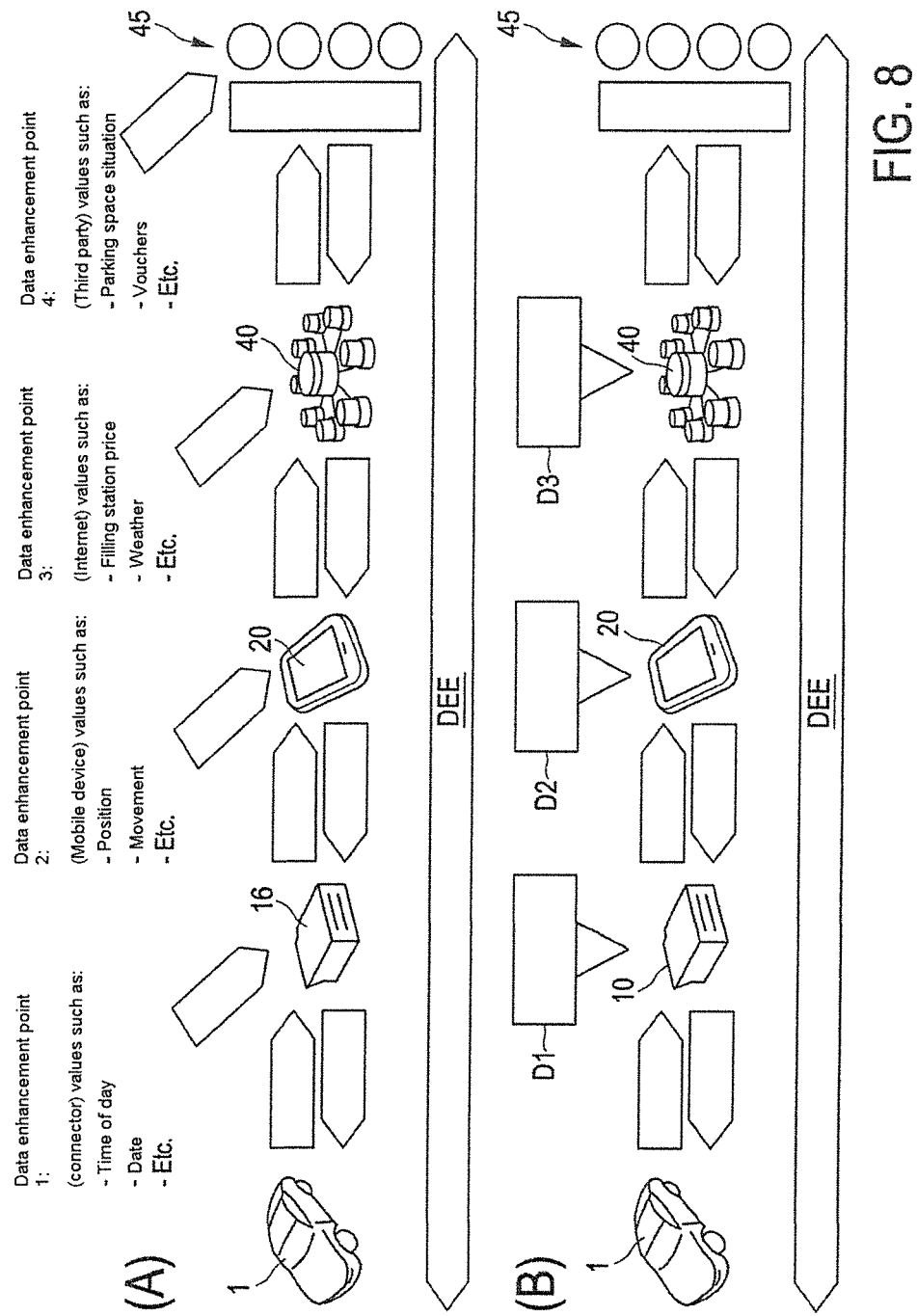
Figure 9:
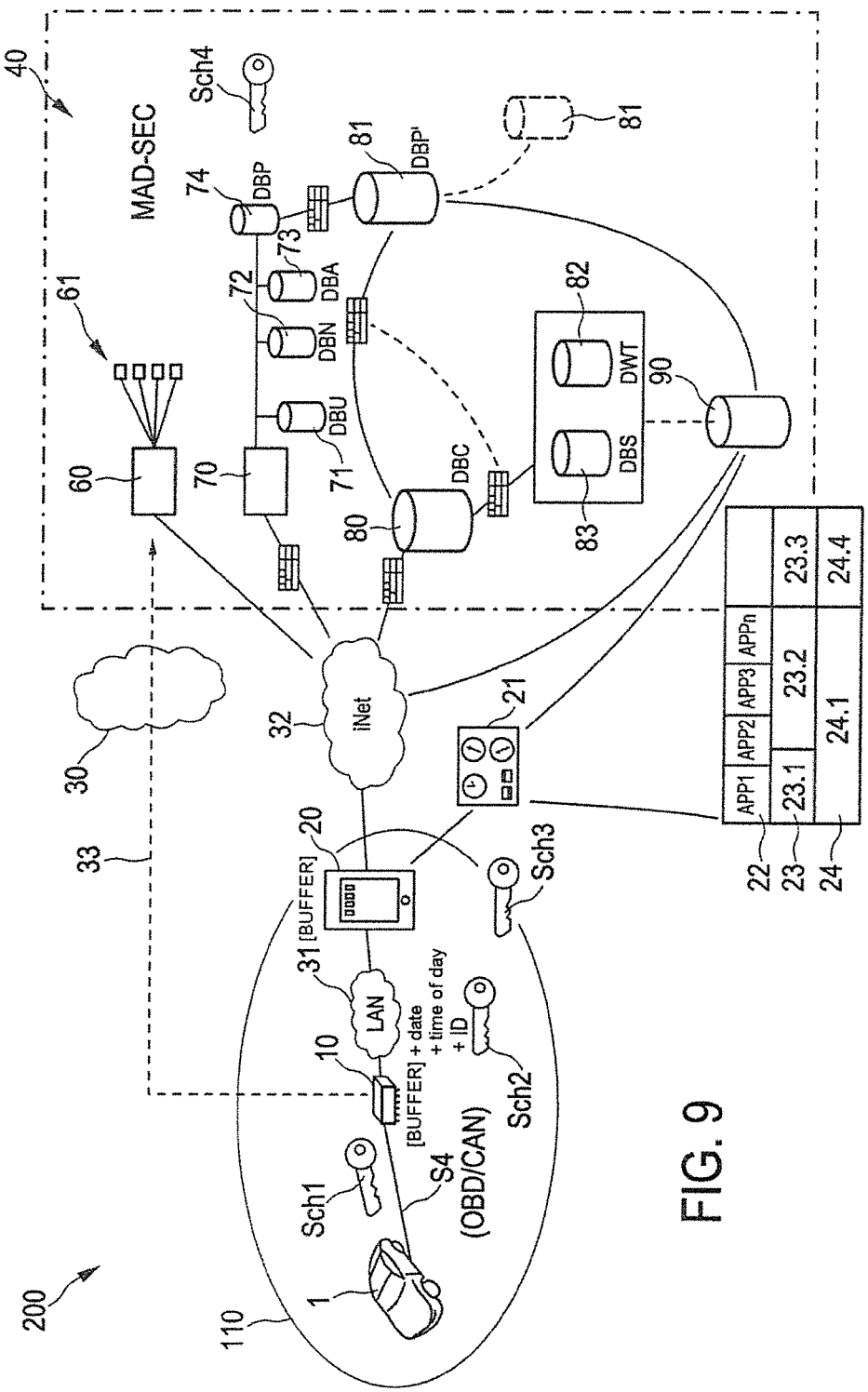

in view B, a simplified schematic illustration to illustrate a method for vehicle communication, in which vehicle diagnosis data are augmented by supplementary data obtained outside the vehicle diagnosis system, said supplementary data going beyond vehicle diagnosis data;

FIG. 8 shows a substantiation of the method for vehicle communication, wherein particularly an end-to-end flow of data can involve data enhancement with supplementary data and/or data buffering at each station for the flow of data (view A or view B)—the diagram in FIG. 8 provides the specification with the necessary involvement of the user communication terminal—that can nevertheless—as shown in FIG. 9—be modified such that a flow of data occurs directly from the vehicle diagnosis interface to the data network system;

FIG. 9 shows a further preferred embodiment of a diagnosis and control network in a schematic illustration.

DETAILED DESCRIPTION

Figure 1:
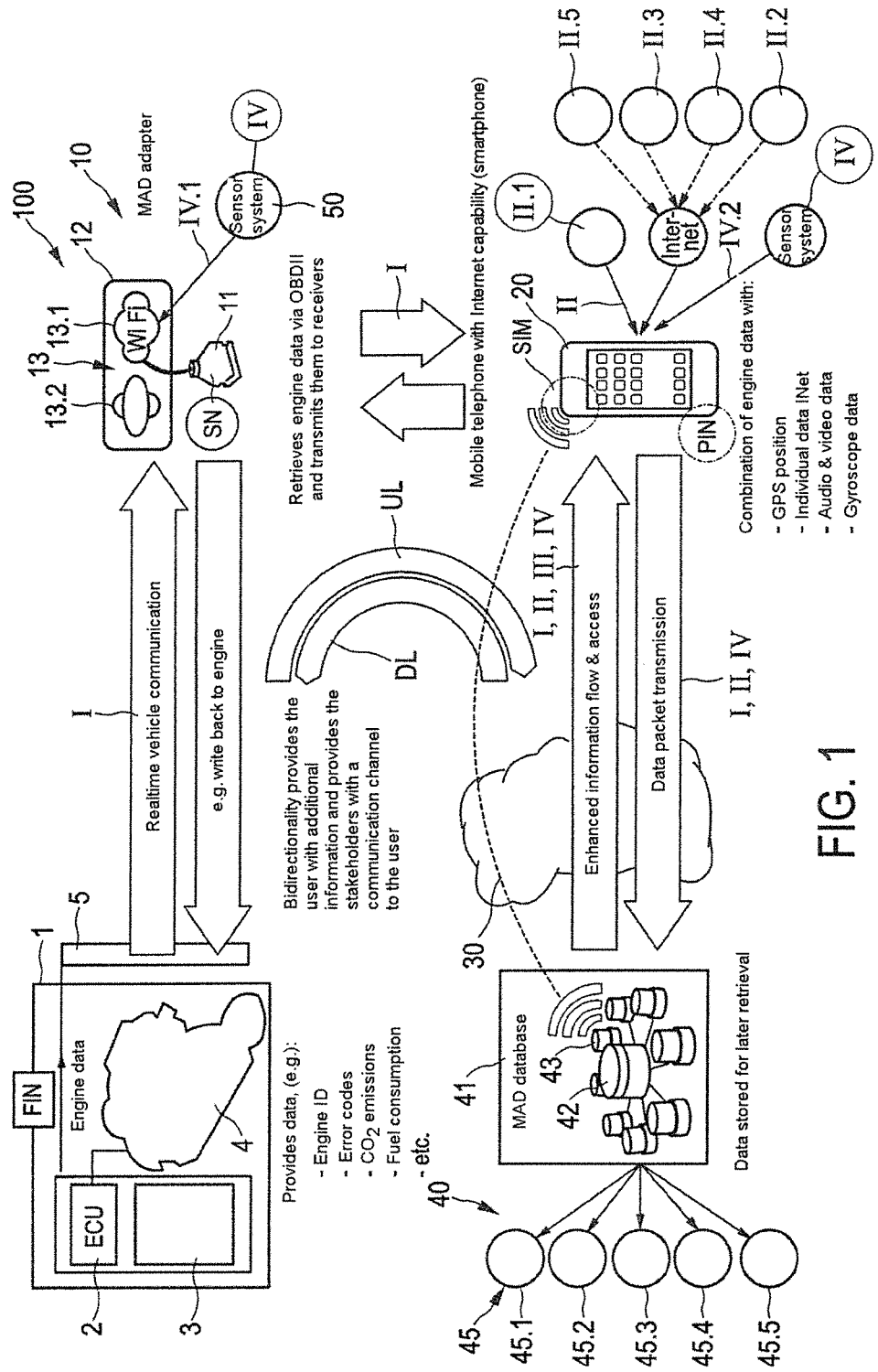
FIG. 1 shows a schematic overview of a diagnosis and control network for a multiplicity of vehicles with a respective vehicle-implemented vehicle diagnosis system, based on the concept of mobile assisted driving (Mobile Assisted Driving)

FIG. 1 shows a diagnosis and control network 100 for a multiplicity of vehicles, from which a single vehicle 1 is shown symbolically. The vehicle 1 has a vehicle control system 2 with a vehicle controller ECU and a vehicle diagnosis system 3. Both the vehicle controller ECU and the vehicle diagnosis system 3 have control and/or data access to an engine 4 in the vehicle 1, so that engine data can be transmitted from the vehicle control system 2 to a vehicle system interface 5—in this case an OBD-II interface. Besides the engine data, exhaust-related vehicle data from the vehicle diagnosis system 3, in particular, are also present on the vehicle system interface 5. In the present case, the vehicle system interface 5 is in the form of an OBD-II interface, but may also be a further development thereof such as an OBD-III interface or an alternative interface, such as an SAE interface. The explanation below of the preferred embodiment as shown in FIG. 1 is provided using the example of an OBD-II system as a vehicle-implemented vehicle diagnosis system 3 without any limiting effect—in principle, this may be any OBD-based or SAE-based system or else an Ethernet-based system with an RJ interface. Preferably, an interface couples to a CAN bus in a vehicle. Other BUS systems in the vehicle, such as K-Line, L-Line, SAE J1708, LIN, PWM, Flexray, CAN, TT-CAN, TTP and MOST or the like, can also be coupled using appropriate interfaces. These are usually (not always) actuated via the ZGW (central gateway). The interface in the form of a CARB or OBD socket is in turn connected precisely to the ZGW via CAN and in future via Ethernet (DoIP), e.g. via an RJ connector. The vehicle diagnosis interface 10, which is also explained, can be customized, and accordingly coupled to this and other types of interfaces of the vehicle diagnosis system using a compatible interface connector 11 and is accordingly sometimes also called an adapter for short here. For such a vehicle 1, FIG. 1 shows a diagnosis and control network 100 with the components explained below.

In the present case, a vehicle diagnosis interface 10 is designed with an interface connector 11, an interface module 12 and an air interface 13. In the present case, the air interface 13 has a first antenna module 13.1, which is designed for wireless bidirectional network communication in a local area; the first antenna module 13.1 is implemented as part of a WiFi interface in the present case, but is not limited thereto. The first antenna module 13.1 of the air interface 13 may also be implemented as part of a Bluetooth, LAN, particularly WLAN, WPAN or PicoNet or suchlike locally limited air interface that has a suitable antenna or the like therefor.

In the present case, the air interface 13 also has a second antenna module 13.2, that is designed to perform a unidirectional broadcast function, i.e. to transmit messages, at least in a local area of up to at least 500 m or the like. By way of example, the broadcast function can be used for "car-2-car" telecommunication, which is explained in more detail in FIG. 3. The broadcast function can also be used for "car-2-X" telecommunication beyond this, for example.

The network 100 also has a mobile user communication terminal 20, which in the present case is in the form of a smartphone. The air interface 13 can be used to continuously transmit the vehicle diagnosis data I obtained from the OBD-II interface to the user communication terminal 20 in real time at any rate; the vehicle diagnosis data I are therefore available to the smartphone too in real time and continuously.

Similarly, the smartphone has a series of supplementary data II present on it that can be obtained via one or more modules, such as via a GPS module, of the smartphone. The supplementary data II can also be obtained via an Internet connection of the smartphone. Merely by way of example, a position II.1 that can be obtained via the GPS module or a map II.2 or cost center II.3 or parking space situation II.4 or multimedia data II.5 such as audio and video data or other image data, which is/are available via the Internet, is/are available as supplementary data II here.

In principle, the network 100 can also be provided with further supplementary data IV from an external sensor system 50, an example of which is subsequently also explained with reference to FIG. 4. The external sensor system 50 may comprise a sensor system for the vehicle (also a vehicle-implemented sensor system), but is not limited thereto. On the contrary, the external sensor system 50 comprises particularly a system of external vehicle sensors that, by way of example, can deliver multimedia data, particularly video data or the like, or else temperature values or such ambient data. Particularly an aforementioned external vehicle sensor system can easily be retrofitted to the vehicle. Further supplementary data from an external sensor system 50 can best be made available directly to the air interface 13 as supplementary data IV.1. In addition, or alternatively, supplementary data IV.2 can also be made available to the mobile user communication terminal 20. The supplementary data IV.1, IV.2 can come from the same or different sensors of the sensor system 50.

All supplementary data I, II, IV—and also the supplementary data III that are also explained below—are obtained outside the vehicle diagnosis system 2. At any rate the vehicle diagnosis data I enhanced with a selection of such supplementary data II, possibly also IV, or supplementary data of a further or different type are transmitted to a data network system 40 via a communication network 30 as a packet of vehicle diagnosis data I and supplementary data II, and possibly IV. In the present case, the communication network 30 is a wirelessly available Internet, for example. The supplementary data II and IV are therefore obtained completely outside the vehicle diagnosis system 2, particularly outside the vehicle control system 2, via the mobile user communication terminal 20 or an external sensor system 50 in the present case.

The data network system 40 has a database 41, in which the packets of vehicle diagnosis data I and supplementary data II, IV are available for later retrieval in a memory 42. The memory 42 has a multiplicity of memory units, one memory unit 43 of which is associated with the vehicle 1. In the present case, the association is made by identifying the vehicle 1 using a vehicle identification number FIN and identifying the smartphone using a user identification number (PIN or SIM number) and also a connector number SN. In the present case, a combination of the numbers FIN, SN, PIN and/or SIM is also used as the key in order to set up a protected uplink connection UL between the vehicle system interface 5 and the data network system 40 for the purpose of transmitting the data packet of vehicle diagnosis data I and the supplementary data II, IV. The uplink connection UL also extends to proprietary data systems 45 connected to the database 41; of these, the systems of a police department 45.1, an OEM 45.2, a tollbooth 45.3, an automobile assistance service 45.4 or a state institution 45.5 are shown by way of example in the present case. The data packets (I, II, IV) stored in a personalized database unit 43 are thus available for various evaluations and user-oriented uses.

In addition, the data packet (I, II, IV) of vehicle diagnosis data I and supplementary data II, IV can be augmented by supplementary data III of a further type. By way of example, these may be data from the proprietary data system 45 (for example the availability of spare parts or toll costs or assistance services or federal regulations or police orders) that are obtained directly from the proprietary data systems 45 or are kept available in the database 41 of the data network system 40.

Particularly preferably, according to the concept of the invention, a downlink connection DL from the data network system 40 via the mobile user communication terminal 20 and the vehicle diagnosis interface 10 to the vehicle control system 2 via the vehicle system interface is shown in the present case. The downlink connection DL is designed, according to the concept of the invention, to return not just the vehicle diagnosis data I, but also a data packet (I, II, III, IV) of the vehicle diagnosis data I enhanced by the supplementary data II, possibly IV, and/or enhanced by the further supplementary data III. This is in turn effected largely in real time and continuously insofar as the wireless links of the communication network 30 and the wireless air link 13 permit this within the framework of the data transmission speed. In this way, all supplementary data II, III, IV available via the smartphone or the data network generally or expediently can be taken into account, and used, as a whole in addition to the vehicle diagnosis data I by a vehicle controller ECU and/or the vehicle diagnosis system 3, i.e. the vehicle control system 2, for controlling the engine 4 or the vehicle 1. Ultimately, a template—e.g. from an application APP, a third-party provider or the data network system, explained here in principle, or suchlike infrastructure element, or from the interface module 12 itself as part of the vehicle diagnosis interface 10 with an interface connector 11, an interface module 12 and an air interface 13—allows the vehicle controller ECU to generate a verifiable proposal for a vehicle control function to the vehicle driver in the immediate driving situation or else actually to implement the vehicle control function without driver verification within the framework of suitable safety specification.

The latter is possible particularly in a guaranteed manner, since both the uplink connection UL and the downlink connection DL are made in an encrypted manner—namely using the FIN of the SN and also the PIN or SIM number as a key. The diagnosis and control network 100 shown in FIG. 1 therefore allows mobile assisted control of the vehicle 1, be it fully automatic or semiautomatic, with verification of vehicle control functions by the vehicle driver. The diagnosis and control network 100 therefore has its functionality and data availability designed to be essentially beyond that of standard diagnosis systems.

Figure 2:
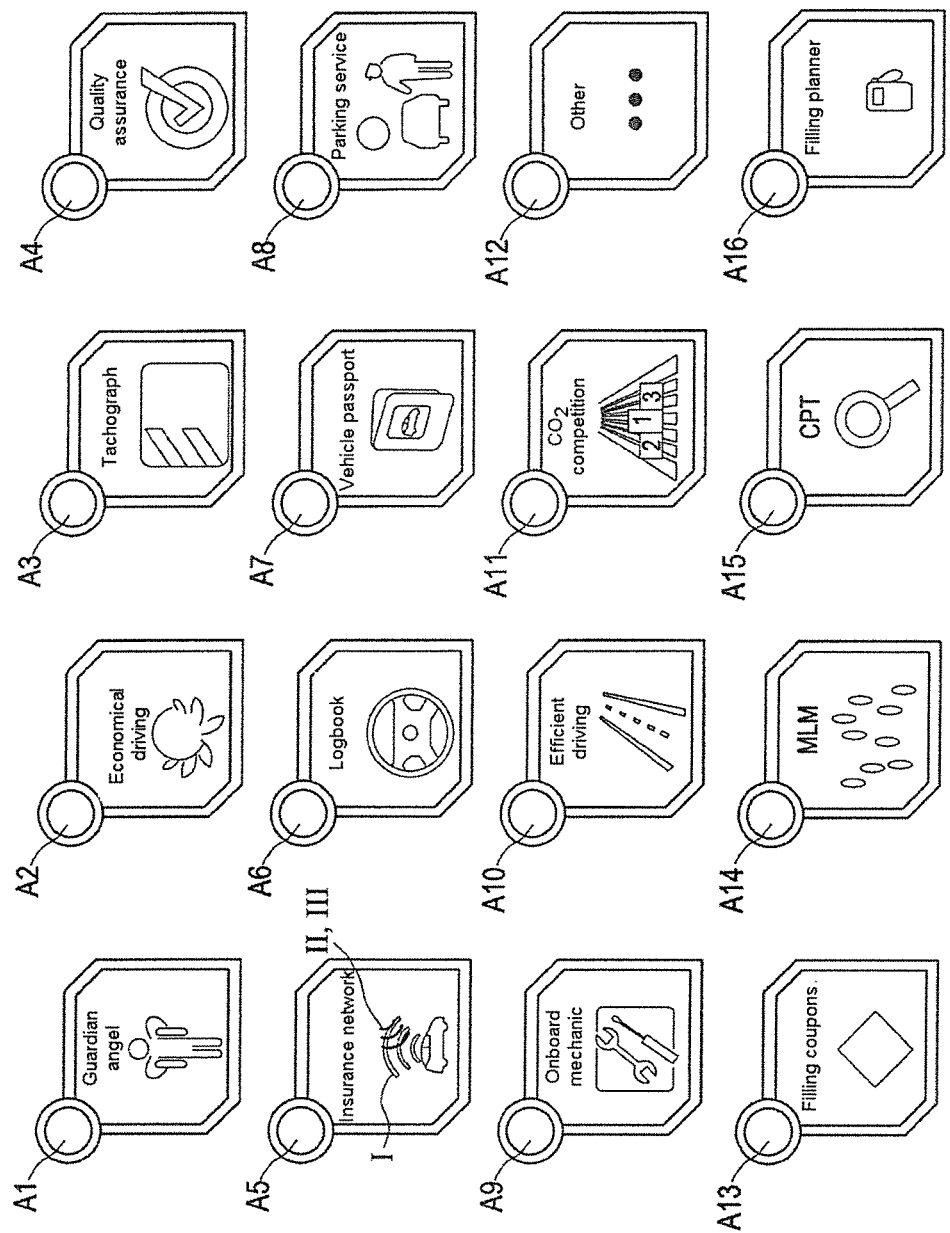

Furthermore, an instruction specification can be created for the purpose of stipulating the relevance of supplementary data for an immediate driving situation within the framework of an open programming environment, for example on the smartphone. In the present case, FIG. 2 is used to explain a few examples that are suitable for implementation within the framework of a programmed software application, for example, interpreter programming for an iPad, an Android, a Blackberry or a Windows-compatible device.

A first group of instruction specifications A1, A5 and A9 allows not just the mere data interchange of the vehicle diagnosis data I bidirectionally, but furthermore also the return flow of supplementary data II, III and possibly IV from a previously explained mobile user communication terminal 20 and a data network system 40, as fundamentally symbolized in the instruction specification A5. If need be, such an instruction specification A5 can be extended in order to allow data interchange with specific proprietary systems, such as an insurance company or the like.

Within the framework of an instruction specification A9, it is possible, by way of example, for a proposal to be made for a vehicle repair during the journey or when a vehicle is stopped independently of a garage; if necessary, the instruction specification can make simple repairs without driver verification within the framework of an altered vehicle control function. In particular, this may relate to software corrections or the loading of updates or the like for a vehicle controller ECU or a vehicle control system 2 and for a vehicle diagnosis system 3. If necessary, this can also result in an engine 4 in the vehicle 1 being able to be operated by altered characteristic curves that can be loaded via a downlink connection DL and used during a journey. Such a change to the vehicle control function can be made within the framework of a vehicle control proposal, for example for a particular immediate period (for example, for intermittently accelerating the vehicle) or for fundamental static setting (for example for economical driving) of an engine 4.

Within the framework of a particularly preferred instruction specification A1, an accident check can be performed on a downlink connection DL and accident notification can be performed on an uplink connection UL. This allows a fundamentally improved reaction for the database in the event of an accident and particularly a faster reaction speed in the event of an accident. By way of example, the instruction specification A1 can provide, in sequence, for the event of an accident to be followed by the mobile user communication terminal 20 registering a tremor, via a gyroscope or the like. Instruction specification A1 can also access airbag status, brake, engine status, etc., for example. In a further step, the vehicle driver can be presented with a request within a particular short period, for example 10 seconds, to operate a contact key—be it on the smartphone or the vehicle control center. Instruction specification A1 can automatically call the rescue center when a termination is not initiated. In a further step, when the period has elapsed without further driver verification, a position can be transmitted to an emergency call center and an audio and/or image connection can be set up via the smartphone. The transmitted image or video can be used by the emergency call center to obtain a current situation and a better picture of the circumstances of the accident (for example, the state of the driver, the number of parties involved, and the local circumstances) and furthermore to set up a voice connection (for example, via loudspeaker and microphone) to one of the occupants of the vehicle 1. This allows an initial assessment of the personal situation in a further step, for example when the person does not react via a video image or other image. In a further step, the vehicle data that are known from the vehicle 1, particularly position data and state data, can then be transmitted to an accident coordination point—even while an emergency vehicle is still in transit—so that essential aspects of an accident are already known to the rescue workers when the emergency vehicle arrives. The instruction specification A1 thus provides an advantage with respect to the registration of a serious accident, faster reaction by the rescue workers on account of automatic and comprehensive notification and a broader database relating to localization and initial assessment.

A further group of instruction specifications A2, A10 and A11 allows driving behavior to be controlled on a downlink connection DL and driving behavior to be analyzed on an uplink connection UL.

By way of example, particularly economical low fuel consumption can be prescribed for the vehicle controller ECU within the framework of the instruction specification A2. In particular, this is possible with the diagnosis and control network 100 of the present type, taking into account the local circumstances for the immediate driving situation, i.e. taking into account gradients, tunnels or speed limits. It is also possible to take into account individual drivers or driver types, weather data, other vehicles, etc. Such data are regularly not available via simple diagnosis systems.

It is also possible to stipulate a particularly efficient driving behavior within the framework of an instruction specification A10.

Particularly low $CO_2$ consumption can be prescribed within the framework of an instruction specification A11.

Within the framework of a further group of instruction specifications A3 and A6, it is possible for journey route stipulation to be effected on a downlink connection DL and journey route analysis to be effected on an uplink connection UL, for example, via the smartphone.

By way of example, it is thus possible to create an automated logbook of instruction specifications A3 or an objective comparability of driving styles on the basis of comprehensible numbers.

By way of example, a further instruction specification A6 may provide for the vehicle 1 first of all to be started, the instruction specification A6 to be initialized and a starting point to be determined and stored. The vehicle driver can then determine whether a business or private trip is being undertaken, for example by means of an input via the smartphone. In a further step, the route, which can be prescribed using a route planner on the smartphone, is taken. In this case, the instruction specification A6 records all the relevant data, such as the individual selection of date, speed, consumption, standing times, filling, etc., and transmits them. In a further step, the end of the route is marked, possibly determined by the vehicle driver, and stored by the instruction specification A6.

By virtue of the connection between user communication terminal 20 and data network system 40, the instruction specification A6 allows evaluation of the data not just from the driver but also from a fleet manager or the federation, for example; the latter may be relevant to tax inspectors, for example. Within the framework of a further step, it is possible, by way of example, for proprietary data systems 45 to carry out an assessment on the basis of comparison data in order that the driving behavior (for example for insurance purposes or regarding wear purposes for spare parts or regarding assistance services) is assessed.

A detailed logbook within the framework of the instruction specification A6 is changed easily and can be implemented in revision-proof fashion. Subsequent analysis of the use is possible. Furthermore, it is possible for the measurable performance when driving the vehicle 1 to be compared with an average and for said comparison capability to be rated and/or paid for or approved on the basis of success if need be.

Within the framework of a further group of instruction specifications A7, A4 and A8, it is possible to perform a journey route and/or driving behavior cost balancing, for example; the automatic customization of insurance charges or guarantees according to the instruction specification A4 or the automatic payment of toll charges or parking charges according to the instruction specification A8, for example. This can have the advantage that such charges can possibly be settled with a reservation claim in good time before the charge-based service is used. In particular, vehicle passport data can be updated on a downlink connection DL or stored on an uplink connection UL within the framework of the instruction specification A7. Said storage is found to be particularly advantageous when the vehicle 1 changes owner, which means that vehicle tracking are available with the federation 45.5 or police station 45.1, for example, on the basis of such data.

A particular advantage of all the aforementioned instruction specifications is that they can be prescribed and programmed individually within the framework of an open programming environment by the vehicle user or the user of the smartphone; what is known as an applet. Such applets can also be provided as proprietary data systems 45, depending on the interests and possibly the agreement situation with the vehicle keeper. In this case, the concept of the invention to provide an open programming environment at least on the mobile user communication terminal for the instruction specification is found to be particularly advantageous. Such open programming environments may not just be compatible with a multiplicity of providers of user communication terminals but, furthermore, open programming environments exhibit a high level of dynamics in terms of innovation, individualization, and further development.

The presented selection of instruction specifications A1 to A11 can thus be personalized and extended as desired within the framework of further instruction specifications A12, in order to perform vehicle control within the framework of the presented diagnosis and control network 100 in an automated and personalized manner.

By way of example, it is thus possible to set up a personal filling assistant in A13, which filling assistant indicates preferred filling stations close to the current local position and, by the initiative of the filling station, permits offers therefrom; by way of example, it is possible to select a particular type and/or brand of filling station. A filling station can send the driver special offers, advertising and the like. A14 symbolizes an application that allows experiences to be exchanged with other drivers within the context of a type of network. A15 symbolizes a CPT (custom product trace) application, explained basically above, i.e. an end-to-end life cycle consideration of vehicles and their drivers that may also comprise a drive recorder, similar to a Black Box from aircraft. A16 can be used to set up a personal filling assistant, for example, which indicates preferred filling stations close to the current local position as soon as the tank level falls below a particular threshold; it therefore basically symbolizes automatically selectable management and/or limitation of the fuel consumption. In particular, the application A16 can provide for the best filling station for the driver to be proposed on the basis of parameters such as personal driving behavior, tailback situation, tank content, weather, destination and filling station prices along the personal route.

Figure 3:
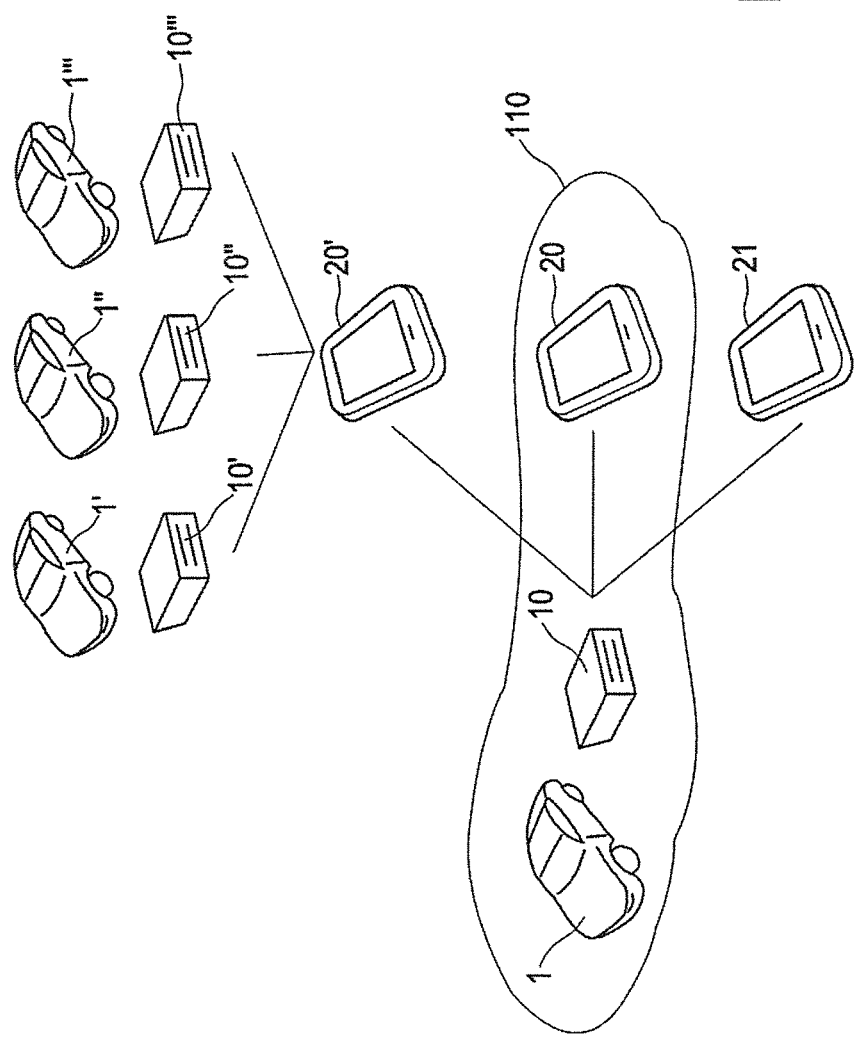
FIG. 3 shows a schematic illustration that fundamentally shows that a plurality of vehicles having a plurality of vehicle diagnosis interfaces may be associated with a mobile user communication terminal (upper part) and similarly a plurality of mobile user communication terminals may be associated with a vehicle (lower part)—depending on the type and number of such connections represented by communication links it is possible to use, for what is known as an N-2-N system, from a multiplicity of vehicle diagnosis interfaces and user communication terminals for a particularly preferred additional system of car-2-car communication on the basis of a broadcast function.
Figure 7:
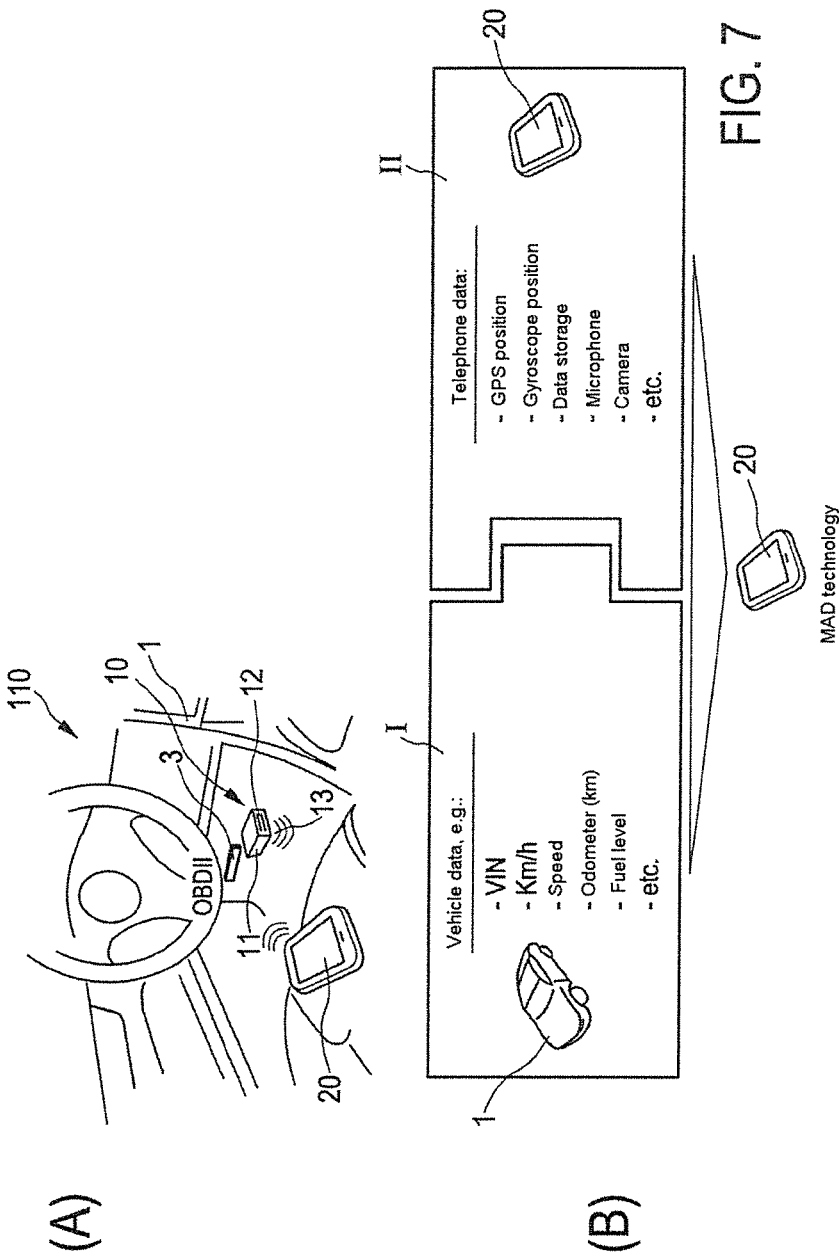
FIG. 7 shows, in view A, a simplified diagram to illustrate the core components of a diagnosis and control network, namely a vehicle, a vehicle diagnosis interface and a user communication terminal, and also possibly (not shown) a data network system.

FIG. 3 shows schematically the option of what is known as an N-2-N systems for vehicle communication, in which system the previously-described vehicle 1 can use a vehicle diagnosis interface 10 to communicate with the previously described user communication terminal 20—that is to say within the core components 110—explained in FIG. 7. Furthermore, within the framework of the N-2-N system shown, communication paths to other user communication terminals also arise, for example, a further user communication terminal 21 that is associated with the aforementioned vehicle 1 and can be used as an additional extended console besides the user communication terminal 20. It is also possible for yet another user communication terminal or a multiplicity of such other user communication terminals 20' to be provided, to which one or more vehicles 1', 1'', 1''' are in turn linked by means of appropriate vehicle diagnosis interfaces 10', 10'' and 10'''.

Figure 4:
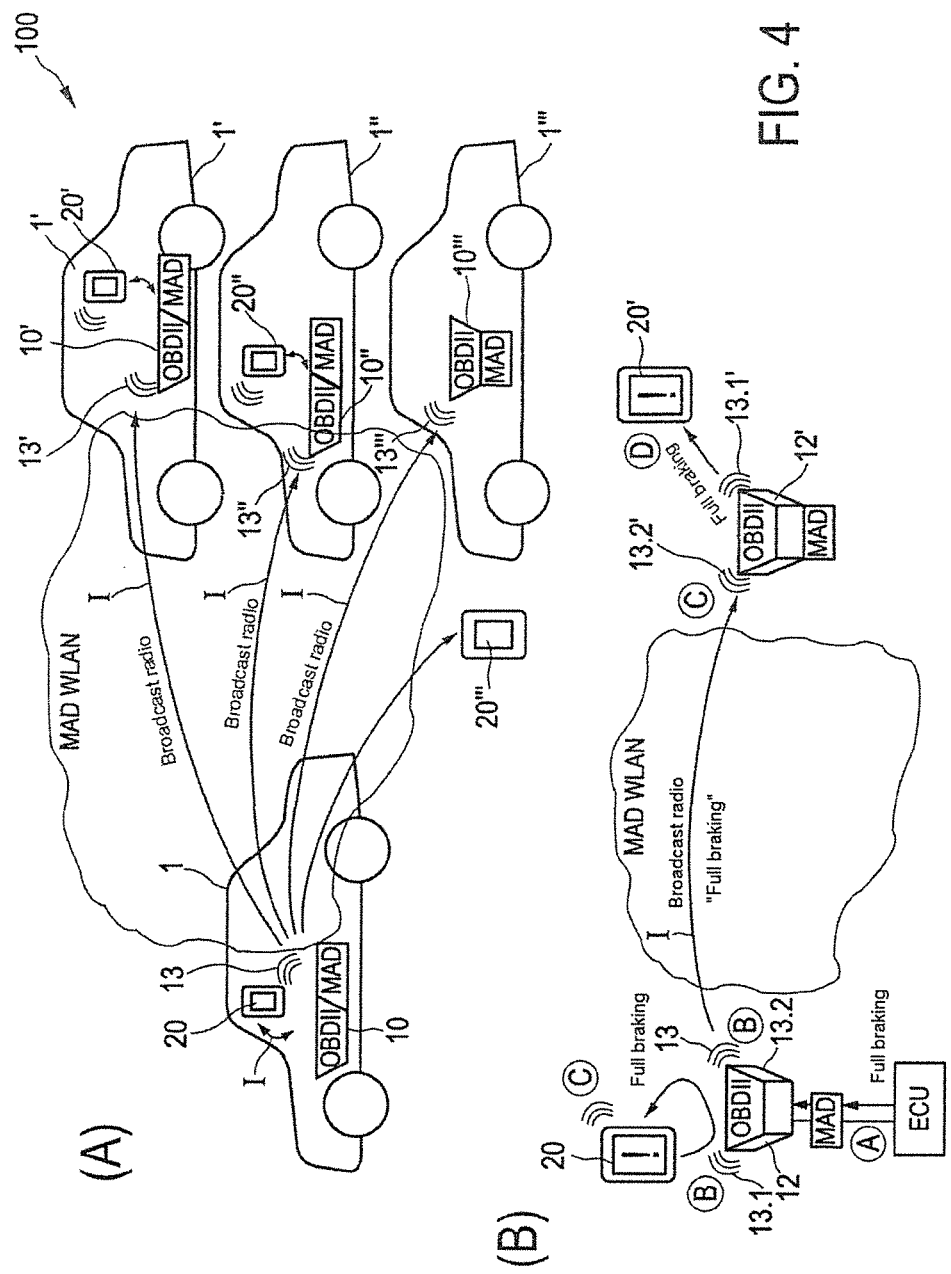
FIG. 4 shows an exemplary embodiment detail illustration for a particularly preferred additional system of car-2-car communication on the basis of a broadcast function.

View A in FIG. 4 shows a particularly preferred modification of an embodiment of a diagnosis and control network 100. The latter comprises not only an aforementioned vehicle 1 and the aforementioned vehicle control system 2 and also the mobile user communication terminal 20 connected thereto by means of the vehicle diagnosis interface 10 but also a multiplicity of other vehicles 1', 1'', 1''' etc. with appropriate components of similar design 10', 20', 10'', 20'', 10''', 20''', etc.

Vehicle diagnosis data I from the vehicle 1 can be transmitted by radio broadcast from the vehicle diagnosis system 3 of the vehicle 1, which is implemented in the vehicle shown in FIG. 1, via the aforementioned air interface 13 of the vehicle diagnosis interface 10 to an appropriate air interface 13', 13'', 13''' of another vehicle 1', 1'', 1''' and in the other vehicle can be transmitted to another mobile user communication terminal 20', 20'', 20''' that is associated with the respective other vehicle 1', 1'', 1'''. The example in view A in FIG. 3 also shows that, by way of example, a user communication terminal 20'' does not necessarily have to be in the interior of the vehicle 1''. In this respect, the broadcast function—for example provided by means of an antenna module 13.2 in FIG. 1—of the air interface 13 ensures that at any rate vehicle diagnosis data I from the vehicle 1 are also available to the other vehicles 1', 1'', 1'''. Irrespective of this, a further antenna module 13.2 of the air interface 13 on the vehicle diagnosis interface 10 of the vehicle 1—in this case a WLAN—can be used in order to supply not just the user communication terminal 20 of the vehicle keeper of the vehicle 1 with vehicle diagnosis data I but rather—appropriately denoted and/or in suitably limited form—possibly also directly further user communication terminals, such as smartphones 20', 20'', 20''', which may be inside or outside the further vehicles 1', 1'', 1'''.

In the present case, a broadcast message, a broadcast radio transmission, is understood to mean particularly a small data packet with comparatively limited data volume that can be used to communicate vehicle diagnosis data in coded form, for example, through a vehicle diagnosis interface 10', 10'', 10''' and hence to other vehicle diagnosis systems of other vehicles 1', 1'', 1'''. Hence, the vehicle diagnosis data I are also available to other vehicles in the further close environment around the vehicle 1—be it via the broadcast function or a WLAN. In addition, or as an alternative to a broadcast radio transmission, it is therefore particularly also possible for WiFi, WLAN, WPAN or such wireless networks to be used to present such a broadcast. An advantage of wireless networks in this case is that a communication can be sent to mobile telephones that are not connected to an adapter (e.g. pedestrians, other automobiles without the technology of mobile-assisted driving described here by way of example).

Furthermore, particularly the broadcast function is suitable for making announcements about particularly critical vehicle states of the vehicle 1 to the further close environment. An example of this is shown in view B of FIG. 3.

By way of example, an ECU can provide the interface module 12 with the information of full braking in the vehicle 1 in step A. In a second step B, the interface module 12, particularly a logic unit accommodated therein, can identify this information as relevant to safety for other vehicles 1', 1", 1'" etc., too and can transmit it not just via the antenna module 13.1, but also via the antenna module 13.2 that is available for a broadcast function. Hence, this information is available in step C not just to the user communication terminal 20 of the vehicle keeper but also—possibly more importantly—to the interface module 12' of the other vehicle 1'. In a step D, this safety-related information is also forwarded to the user communication terminal 20' but is associated with the other vehicle 1'. Naturally, in other cases, this information can also be sent directly to the user communication terminal 20' via a WLAN network—however, the broadcast radio function of the antenna module 13.2 or 13.2' is suitable in a particularly preferred manner. By way of example, the user communication terminal 20' can output an alarm tone or suchlike predefined signaling to the vehicle driver of the other vehicle 1' even before he would be able to register the full braking situation with his own eyes. This measure substantially increases road safety in sudden accident situations—at any rate for the further close environment. For example, mass shunt accidents or the like can be avoided more reliably.

Figure 5:
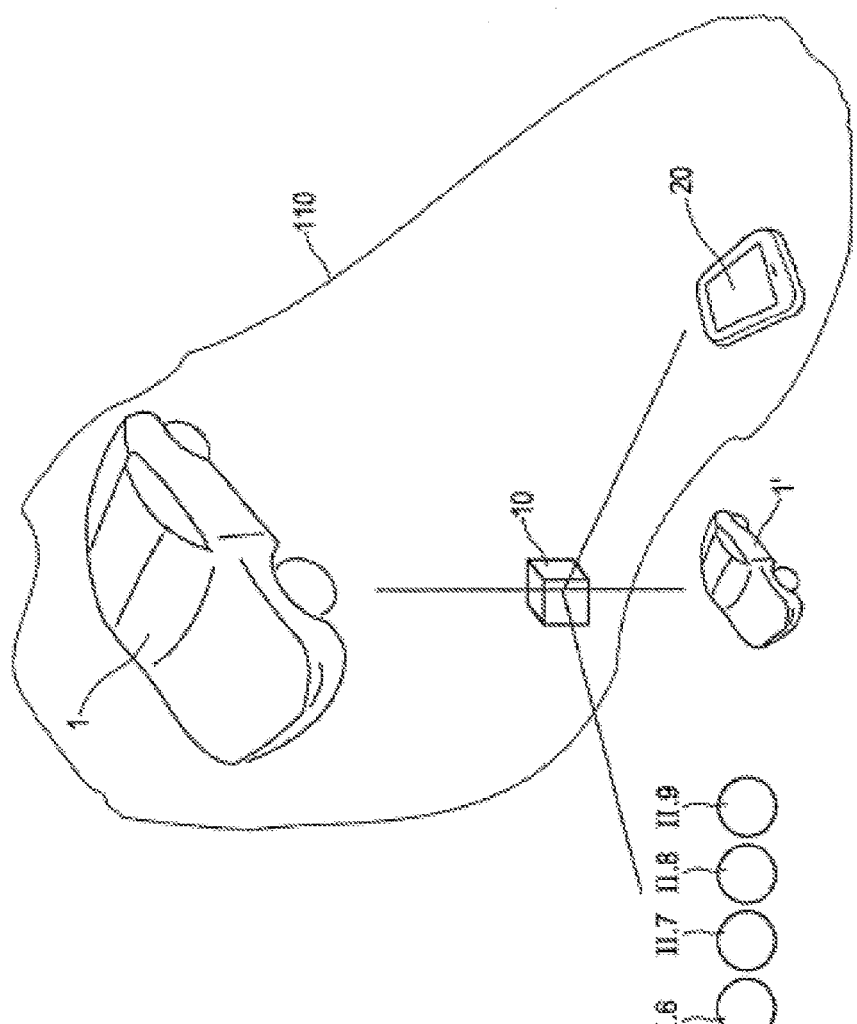
FIG. 5 shows a simplified schematic illustration of what is known as a car-2-X system for vehicle communication between a vehicle and third centers, such as service providers, or else centers within the existing diagnosis and control network, such as the user communication terminal of the vehicle driver or vehicle keeper.

FIG. 5 shows the option of communicatively connecting the aforementioned vehicle 1 to such and other vehicles 1' or to the aforementioned user communication terminal 20 of the vehicle driver or vehicle keeper via the vehicle diagnosis interface 10 with the aforementioned interface module 12. Thus, while communication is possible within core components 110 within the framework of the car-2-X system shown in FIG. 5, this car-2-X system—unlike the N-2-N system of FIG. 3—allows communication with not only other vehicles 1' but also with vehicle-independent centers, such as service providers II.6 (police), II.7 (OEM vehicle manufacturer), II.8 (charge center for highways or the like), II.9 (ADAC or suchlike automobile assistance services). Other vehicle-independent centers not explicitly shown here relate to road site equipment (RSE), particularly centers where information important to the driver is dispensed or centers that can be used as a test center. Vehicle-independent centers can also be used as what is known as geofencing, e.g. in order to determine a location for obtaining an entry permit for a parking garage.

Figure 6:
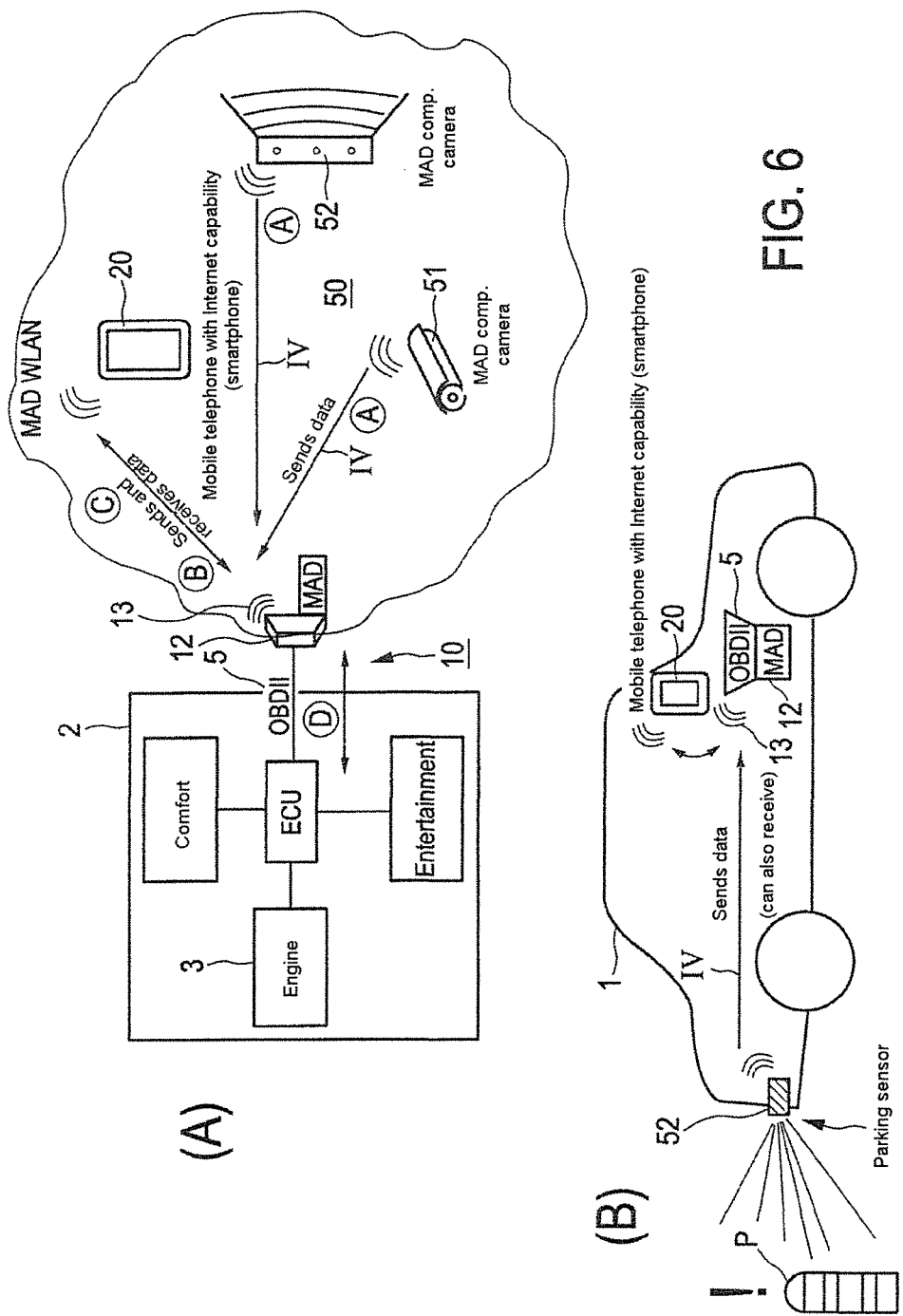
FIG. 6 shows a detailed illustration of a particularly preferred additional system of car-2-X communication on the basis of wireless bidirectional network communication in a local area.

FIG. 6 shows a further modified embodiment in which supplementary data IV are obtained from an external sensor system 50, in this case a number of cameras, for example a vehicle front camera 51 and a vehicle rear camera or a distance sensor 52. Such and other external sensor systems 50 are fundamentally suitable for fitting on the vehicle as add-on electronics without being connected directly to a wiring loom of the vehicle diagnosis system; nevertheless, the supplementary data delivered thereby via the vehicle diagnosis interface 10 and the interface connector 11 thereof, the interface module 12 and the air interface 13 can be made available to the vehicle via the BUS thereof. This is illustrated in reference to a vehicle control system 2, that contains not only the ECU and the vehicle diagnosis system 3 but also further control modules, inter alia for vehicle comfort and vehicle entertainment. The vehicle control system 2 communicates with the environment via a vehicle system interface 5 that has already been described with reference to FIG. 1—in this case an OBDII interface again—in the manner known from the description of FIG. 1, namely via the already described interface module 12, which is consistently also called an MAD (mobile assisted driving) adapter. In the present case, the supplementary data IV can be made available to directly to the vehicle diagnosis interface 10 from an external sensor system 50. In the present case, in a step A the supplementary data IV obtained from a sensor system 50 are sent via a WLAN environment to the antenna module 13.1 of the interface module 12. In further steps B, C, data can be interchanged bidirectionally—i.e. by sending and receiving data—with the mobile user communication terminal 20 via the air interface 13, i.e. again via the first antenna module 13.1. In this case, the return flow in step C can be effected in the manner explained with reference to FIG. 1 by enhancing the vehicle diagnosis data I with supplementary data II and/or III. The interface module 12 then has not only supplementary data II and III of the type explained with reference to FIG. 1 but furthermore also sensor data relating to the direct vehicle environment as supplementary data IV. In a further step D, the original vehicle diagnosis data I enhanced by the aforementioned further supplementary data II, III and IV can be forwarded to the vehicle control system 2, particularly to the ECU and the vehicle diagnosis system 3 or else to multimedia devices in the vehicle, e.g. a combination instrument, navigation device, etc.

View B in FIG. 6 illustrates a particularly significant traffic situation using the modified system explained above. In this case, supplementary data IV in the form of distance data for the distance to a bollard P are made available to the vehicle system interface 5 via a WLAN when reverse parking and are sent to the smartphone via the interface module 12.

View A in FIG. 7 schematically shows the core components—so-called here—of the diagnosis and control network 100 described in detail by way of example in FIG. 1. These are the core components 110, as can be found in a vehicle following adoption of the concept of the invention, for example when a service as described by way of example in FIG. 7 is requested from a third center, i.e. a vehicle-independent center. In this case, the core components 110 of the vehicle communication comprise the vehicle 1, the interface module 12 and the vehicle diagnosis interface 10 for connection to the vehicle diagnosis system 3 on an OBD-II connector thereof—or similar connector of comparable vehicle diagnosis systems—, wherein the vehicle diagnosis interface 10 comprises the interface module 12, an interface connector 11 and an air interface 13. The core components 110 thus relate to or identify particularly the vehicle 1, the vehicle diagnosis interface 10 and a user communication terminal 20, that is able to communicate wirelessly with the vehicle diagnosis interface 10.

View B in FIG. 7 schematically shows vehicle diagnosis data I and schematically shows supplementary data II, which are made available by a user communication terminal 20, in this case a smartphone. The vehicle diagnosis data I and the supplementary data II can be combined to form a common set of data, as symbolized in FIG. 2, view B. By way of example, the vehicle diagnosis data I comprise the vehicle identification number VIN, a speed statement in real time, an odometer reading in real time, and a tank indicator in real time. By way of example, the supplementary data II comprise data, as are available in the case of a smartphone, for example a GPS position, an acceleration statement measurable with a gyroscope, other data from a data memory, an audio stream recorded by a microphone, a video stream recorded by a camera or other multimedia recordings that may be conducive to an immediate driving situation. By way of example, the supplementary data can be selected within the framework of applications that can be created as needed in an open programming environment. As a result, the user communication terminal 20 in the form of the smartphone can represent an extended monitor console, possibly even control or regulatory console, for the automobile; a complete implementation of extended control, regulatory and monitor features in a vehicle implemented multimedia system can be bypassed or augmented particularly easily. In addition, the present concept provides the option of not just making useful information available to the vehicle driver and vehicle keeper, but furthermore, also making it available to third centers that are vehicle-independent. This can form the basis for the provision of services for the vehicle keeper in a manner customized according to need, said vehicle keeper in turn being able to use services in a simplified manner. As an extended console, the user communication terminal 20 is used in addition to the control console of the vehicle.

FIG. 8 shows the core components 110 shown in FIG. 7, namely the vehicle 1, the vehicle diagnosis interface 10 and the user communication terminal 20 together with the data network system 40 and the proprietary data systems 45, as have already been described with reference to FIG. 1.

As can be seen from view B in FIG. 8, data buffering—denoted by D1, D2, D3 here—can take place on every component, particularly the vehicle diagnosis interface 10, the user communication terminal 20 and the data network system 40. The connection between the vehicle 1 and the data network system 40 or the proprietary data system 45 is a completely bidirectional end-to-end data connection DEE in the present case. This is not necessarily the case, however, as shown by the embodiment in FIG. 5, for example, in which suitable bypass connections can be used for a bypass to the data communication terminal 20. It is also possible for a return transmission from the data network system to end on the user communication terminal 20 without the need for all data to be transmitted back to the vehicle diagnosis interface 10 or the vehicle.

Specifically, FIG. 8 once again makes it clear that the uplink UL can be used to effect a realtime data transmission from the OBD-II interface of the vehicle diagnosis system 3 by means of a connection to the adapter or interface connector 11 of the vehicle diagnosis interface 10. Also in the uplink, the vehicle diagnosis interface 10 can use its air interface 13, e.g. within the framework of a WLAN connection, to transmit data to the user communication terminal 20. In principle, however, a connection via the Internet 30 is also possible. Also in the uplink, user communication terminal 20 can be connected to the data network system 40 via a mobile Internet connection. The data network system 40 in turn sets up an interface to proprietary data network systems 45, i.e. essentially databases with third-party providers. By way of example, time of day, date, etc., can be transmitted in the uplink from the adapter of the vehicle diagnosis interface 10, e.g. to the mobile user communication terminal 20 and/or to the data network system 40. Usually, the vehicle uses its interface or the BUS to send only vehicle diagnosis data, such as vehicle diagnosis data such as speed, temperature, etc., via the BUS; but not time and date. According to the concept of this embodiment, these come from the adapter; specifically the interface module 12 of the vehicle diagnosis interface 10. There, values such as time of day, date, etc. can additionally or alternatively be added to any vehicle-related data or vehicle diagnosis data. By way of example, a date stamp and time-of-day stamp may be provided for the vehicle diagnosis data. The enhancement takes place in the interface module 12 of the vehicle diagnosis interface 10; the vehicle cannot usually process data such as time of day and date in an interface. Time of day and date are therefore found to be supplementary data, which can already be enhanced in the vehicle diagnosis interface 10. This data record provided with a time stamp can be transmitted to the user communication terminal 20, for example via a WLAN or Internet connection. There, the position, the state of movement, i.e. particularly the state of acceleration and speed or the like, can be added at a second data enhancement point.

At the further data submission point, values such as filling station prices, weather, etc., can be added. At the further fourth data submission point, values such as parking space situation, vouchers, etc., can be indicated.

In the downlink, in turn, supplementary information can be returned via the interface, optionally just as far as the data network system 40 or optionally just as far as the user communication terminal 20 or optionally just as far as the diagnosis interface module 10 or optionally completely into the vehicle diagnosis system of the vehicle 1. FIG. 9 describes a modified embodiment of a diagnosis and control network 200, for which, within the framework of identical or similar features or features having an identical or similar function, the same reference symbols are used for description for the sake of simplicity.

As core component 110 of the diagnosis and control network 200, a vehicle 1, a vehicle diagnosis interface 10, which is designed to have an interface connector 11, not shown in more detail, an interface module 12 and an air interface 13, and also a mobile user communication terminal 20 and a data network system 40 are shown. On this basis, it is is possible to implement mobile vehicle-assisted driver assistance and/or mobile device assisted driving. In the present case, a connection exists between the vehicle diagnosis interface 10 and the user communication terminal 20 via a local area network 31, in this case a WLAN; in particular, a WiFi or suchlike local area network that is as wireless as possible, is possible. A wireless connection between the user communication terminal 20 and the data network system 40 exists over the Internet. In principle, a cellular network for mobile communication or the like can be used as wireless network connection. In principle, the latter is independent of the communication technology. Thus, by way of example, it is possible to use an iNet over an LTE, UMTS, GSM or suchlike standard to form a regional network 32. In the example of a modified diagnosis and control network 200 as shown in FIG. 9, the mobile user communication terminal 20 is used as a coupling element between the local area network 31 and the regional network 32. In principle, the mobile user communication terminal can be bypassed for particular functions, namely by a wireless communication network connection 33—shown in dashes in the present case—directly to the data network system 40, for example. The data network system 40 shown in the present case comprises what is known as an app store 60 for holding particular applications, a suitable management and authorization device 70, a vehicle-based database 80 and also particular IT service provider devices 90.

An app database comprising the app store 60 can advantageously be used as an authorization database within the data network system 40 when these are entered only by an authorized center. By way of example, said database can be configured such that only apps from the app database within the data network system 40 have the capability of communicating with the connector.

An app store 60 is optional in the data network system 40; this can also be provided by third parties outside the data network system 40.

In the present case, the devices 60, 70, 80, 90 of the data network system 40 are used to enhance the data and software applications (devices 60, 90) made available to the user communication terminal 20 and to increase the data quality and data integrity for authorization (device 70) and evaluation (device 80).

In the present case, the user communication terminal 20 is provided with a surface 21 that, by way of example, in the form presented here, displays control indicators for the vehicle 1. In particular, it is also possible to display extended control indicators which are not available in a standard vehicle. In the present case, indicators concerning $CO_2$ emission values, a compass needle and the distance remaining to the next preferred filling station are provided. Current acceleration values or credits can also be displayed. The surface 21 is a variable design within the framework of an open programming environment. In this respect, the virtual instruments on the surface 21 are found to be replaceable and able to be defined on a user-dependent basis. Within the framework of the open programming environment, it is possible to render dedicated virtual indicators visible on the surface 21 and to personalize them. Behind the surface 21, a memory of the user communication terminal 20 contains a number of apps, which are denoted by App1, App2, App3 . . . Appn here. This firmware or software level 22 is stored with a level-1 23, which defines certain technical interfaces between user communication terminal 20 and the vehicle diagnosis interface 10. The level-1 23 also implements authorization and configuration environments for the applications and also the general authentication, identification or authorization check for a user of the communication terminal 20. The level-1 23 also defines and operates the technical interface between the communication device 20 and the vehicle diagnosis interface 10. The technical interface between the user communication terminal and the data network system 40 is also defined in a module of the level-1 23. Accordingly, a module 23.1 for implementing authorization, a module 23.2 for implementing the communication with the interface 10 and a module 23.3 for implementing the communication with the data network system 40 are denoted in the present case. The level-2 24 is used for managing capacities in the user communication terminal 20 and for managing the interface 10; namely in a first module 24.1 for prioritizing access operations on the interface 10 and the device 20 and in a second module 24.2 for the general management of capacity volumes. Thus, a particular device 60, 70, 80, 90 can be assigned an expedient priority and capacity in the device 20 and/or the interface 10 via the modules 24.1, 24.2.

By way of example, the method for mobile assisted driving can take place such that vehicle diagnosis data are made available in a physical data connection 34—for example via a vehicle CAN bus or suchlike control network in the vehicle directly and/or an OBD-II or suchlike OBD interface or possibly, in one variant, an SAE or RJ interface or other interface of a control bus—to the vehicle diagnosis interface 10, namely to the interface module that is coupled to the OBD-II interface via an interface connector, and is coupled to a CAN bus directly. By way of example, said vehicle diagnosis data include data transmitted in real time relating to an odometer reading, a tank fill level, an airbag status, an ABS status, an indicator light status, a headlamp status and a gearbox status or a gear status in the present case. To safeguard realtime transmission, the vehicle diagnosis interface may have not only a logic unit but also an adequate memory, for example a 1-gigabyte memory, that is capable of buffering a certain volume of data in the interface 10 at particular distance intervals, for example every 10 km. In addition, the interface 10 also has an air interface module, not shown in more detail, for example a WiFi module. Optionally or additionally, a Bluetooth module or a UTMS, or LTE module is possible. A location module, such as a GPS module or suchlike position-finding unit, can also be provided. Preferably, the adapter can be encoded via the data network system 40 and the vehicle and for the user.

In particular, the interface with a certain logic unit, a clock generator and the memory is designed to provide a date stamp, a time stamp and optionally also a location stamp as supplementary data. These supplementary data II, relating to a local time for the vehicle and in the form of a location stamp and a time stamp can be placed at the front of any data packet of vehicle diagnosis data I (namely the aforementioned vehicle diagnosis data, for example), for example as a header, or can be assigned to them in another way. Thus, by way of example, a data packet comprising vehicle diagnosis data that can be taken from a standard vehicle diagnosis system is buffered in a memory of the interface 10 and provided with a header, comprising a location/time stamp for the interface 10. A key portion that is provided for authentication and that contains, in a first portion SCH1, a vehicle identification number VIN that is delivered by the vehicle via the physical connection 34 is added. This first key portion SCH1 has an identification code ID from the interface 10 added to it as a second key portion SCH2. The data packet comprising key portions SCH1, SCH2 is made available to the user communication terminal 20 in said header as a location time stamp with vehicle diagnosis data via the local wireless communication link 31. Said user communication terminal enhances the vehicle diagnosis data with supplementary data that are available to the user communication terminal 20, for example location and movement data that are available via a GPS and a gyroscope unit. The header of the delivered data packet can be aligned, and possibly synchronized, with a location and time-of-day statement and a date statement from the user communication terminal 20.

The aforementioned key, comprising the key portions SCH1, SCH2, is now augmented by a third key portion SCH3, which may comprise a telephone number and/or SIM number or suchlike communication code relating to the device 20, for example.

The device 20 is designed to have suitable technology, such as LTE, UTMS, GSM, but also advanced technologies, such as IPv6 or the like, in order to produce a wireless Internet connection or a local connection, such as a WiFi, WLAN, Bluetooth or similar connection. In the present case, the data packet—comprising the vehicle diagnosis data and also supplementary data, comprising a consolidated and synchronized statement pertaining to date and/or time of day and/or location and also with the three key portions SCH1, SCH2, SCH3—can be sent to the data network system 40 via an Internet connection 32.

The key portions SCH1, SCH2, SCH3 can be used in order to create an authorization code, for example by means of an application on the device 20 or possibly also by means of an application on the interface 10. If need be, this authorization can be confirmed using an identification code, which is available as a fourth key portion SCH4. The authorization code is delivered to an authorization unit 70 of the data network system 40, and there it generates access to the data network system 40 or authorizes said access. In particular, the authorization device 70 may contain an authorization code made up of the key portions SCH1, SCH2, SCH3, SCH4 that have been explained or may contain a passcode associated with the authorization code, which passcode is used for the alignment with the authorization code. The four key portions SCH1, SCH2, SCH3, SCH4 can then be used in order to authenticate the combination of the core components, namely the vehicle 1, the interface 10 and the device 20, before a third center. The aforementioned key portions—comprising VIN, interface ID, telephone number and/or SIM number and also user identification user ID—are intended to be understood only by way of example. In principle, it is also possible to use other codes, such as the aforementioned user ID/code/hash, telephone number of a smartphone, the network ID, IP address or the like from the smartphone, a credit card code, a date of birth or the like for authentication. An association with the authorization code can be made from all codes and/or parts of the codes in the form of the keys, but at least two keys and not necessarily from all listed keys.

The authorization device 70 may in turn have different databases, such as a DBU bank, which records user data, such as name, telephone number, automobile registration, driving state or application availability. This is denoted by 71. The authorization device 70 may also comprise a DBM bank, which is denoted by 72, which holds a number of matrices. Matrices are specific to a particular class of vehicle 1 and ultimately stipulate the matching of the technical interface, namely the matching of the vehicle diagnosis interface 10, to the OBD-II interface and a particular CAN bus. The matrices provide, in particular, that information that provides the adapter with the option of communicating with the vehicle beyond a protocol, e.g. of the OBD interface. They provide—expressed in figuratively comparative terms—a type of map for the present vehicle type. In the present case, the DBM bank 72 delivers a suitable matrix to the user communication device 20, which matrix is processed by means of a level-1 module 23.3 and made available to the interface 10 in order to allow access to the OBD-II interface and/or the CAN bus of the vehicle 1. The authorization of the data string is also implemented in the module 23.1 from level 1.

The adapter, specifically the interface module 12, is delivered "naked", i.e. without fundamental data content. Following a setup, e.g. by telephone connection, it is ready for communication and ascertains the vehicle types present. This can be identified from the FIN for example, or the vehicle type is read using open protocols (such as OBD). The vehicle type is then passed on to a server in the data network system 40. The data network system 40 responds with a data packet that contains the matrix that is necessary in order to understand/address the vehicle outside the publicly standardized access. From this point onward, full functionality of the adapter—that is to say vehicle diagnosis interface 10 with interface connector 11, interface module 12 and air interface 13—is achieved.

The authorization device 70 also comprises a DBA database, that holds a series of applications. From the DBA database 73, it is therefore possible to retrieve the applications 22 running in the device 20 and the applications 22 running on the surface 21.

A person-related database DBP is used to hold particular user data, such as the name, the telephone number, the registration and suchlike user data. It is also possible for Trip IDS, App IDS or suchlike user-specific software data to be held. The DBP database is denoted by 74.

Once the data communication between data network system 40 and interface 10 or vehicle 1 and device 20 has been authenticated, this authentication can be taken as a basis for providers 60 to provide further applications 61 on the device 20.

Vehicle-related databases 80 can hold particular non-person-related data in a DBP database 81, namely particular vehicle data. Thus, particular vehicle routes can be provided with an identification number. Generally, a journey logbook in the DBP database 81 can be associated with the person-related user data in a DBP database 74. The vehicle-related database 80—in this case denoted by DBC—can be used in a suitable manner in order to make certain traffic survey data available in a traffic-related evaluation unit 82. It is also possible for a statistics database DBS, in this case denoted by 83, to carry out statistical surveys with the vehicle data in the DBC database 80. Information technology providers 90 can provide suitable tools in order to manage and evaluate the vehicle-related databases 80, 81, 82, 83 in an appropriate manner.

The data network system 40 can thus firstly transmit a service application to a device 20 that is on hand to assist a vehicle driver with mobile assisted vehicle piloting and control. The data network system can also perform evaluations that are valuable to third parties and the vehicle driver using vehicle-related modules 80, 81, 82, 83. These measures are taken particularly on the basis of permission provided by the authentication unit 70.

LIST OF REFERENCE SYMBOLS

1 Vehicle
2 Vehicle control system
3 Vehicle diagnosis system
4 Engine
5 Vehicle system interface
10 Vehicle diagnosis interface
11 Interface connector
12 Interface module
13 Air interface
13.1 First antenna module
13.2 Second antenna module
20 Mobile user communication device
30 Communication network
40 Data network system
41 Database
42 Memory
43 Memory unit
45 Proprietary data system
45.1 Police station
45.2 OEM
45.3 Tollbooth
45.4 Automobile assistance service
45.5 State institution (federation)
50 Sensor system
51 Vehicle front camera
52 Vehicle rear camera
100 Diagnosis and control network
A1-A16 Instruction specifications
DL Downlink connection
ECU Vehicle controller
FIN Vehicle identification number I Vehicle diagnosis data
II, III, IV Supplementary data
II.1 Obtainable position
II.2 Available map
II.3 Cost center
II.4 Parking space situation
II.5 Multimedia data
PIN/SIM User identification number
SN Connector number
UL Uplink connection

What is claimed is:

1. A method for vehicle communication via a vehicle-implemented vehicle diagnosis system, which is limited to vehicle diagnosis, within a framework of a vehicle control system for a vehicle having a vehicle bus and a vehicle system interface connected to the vehicle bus, comprising:
plugging a vehicle diagnosis interface in the form of a connector into a connector of the vehicle system interface and coupling said vehicle diagnosis interface directly to the vehicle bus, said vehicle diagnosis interface compatible with the vehicle system interface and having an interface module and an air interface,
transmitting vehicle diagnosis data via the air interface to a mobile user communication terminal,
augmenting the vehicle diagnosis data with supplementary data obtained outside the vehicle diagnosis system, wherein the supplementary data go beyond vehicle diagnosis data,
associating the supplementary data with the vehicle diagnosis data for an immediate driving situation by an instruction specification on the interface module, and
predetermining a relevance of the supplementary data to the immediate driving situation of the vehicle by filtering the supplementary data in the instruction specification;
wherein a verifiable proposal for a vehicle control function is made following transmission of the vehicle diagnosis data and the supplementary data back as far as to the vehicle diagnosis interface.

2. The method according to claim 1, characterized in that the supplementary data are associated with the vehicle diagnosis data for an immediate driving situation by means of an instruction specification on the user communication terminal.

3. The method according to claim 1, characterized in that the vehicle diagnosis data and the supplementary data are transmitted back only as far as to the mobile user communication terminal, in a data packet.

4. The method according to claim 1, characterized in that the vehicle diagnosis data and the supplementary data are transmitted further back as far as into the vehicle-implemented vehicle diagnosis system.

5. The method according to claim 1, characterized in that vehicle diagnosis data and/or supplementary data are transmitted between the mobile user communication terminal and a data network system, via a communication network.

6. The method according to claim 1, characterized in that vehicle diagnosis data and/or supplementary data are transmitted between the mobile user communication terminal, and the vehicle diagnosis interface, via a local area network.

7. The method according to claim 1, characterized in that augmentation of supplementary data and/or data buffering of at least the supplementary data take place on at least one of the components selected from the group comprising: vehicle diagnosis interface, user communication terminal, data network system, proprietary and open data systems.

8. The method according to claim 1 characterized in that the instruction specification is created in an open programming environment, and the instruction specification is compatible with the mobile user communication terminal.

9. The method according to claim 1, characterized in that the supplementary data comprise one or more of the pieces of information selected from the group consisting of: position, date and/or time of day, motion state, local close environment, acoustic close environment, temperature, humidity, visual close environment, barometric pressure, motion and/or acceleration values.

10. The method according to claim 1, characterized in that supplementary data are obtained from supplementary modules of the mobile user communication terminal and/or supplementary data are obtained from the communication network and/or the data network system and/or other data systems and/or supplementary data are obtained from an external sensor system and/or supplementary data are made available directly via the air interface module.

11. The method according to claim 1, characterized in that supplementary data from the interface module comprise at least: time of day and date; location data and location time data in the form of uninfluenced supplementary data that are in the form of substantiation data for verifying a vehicle time and/or location.

12. The method according to claim 1, characterized in that the mobile user communication terminal is associated with the vehicle by the interface module and vehicle diagnosis data from a vehicle are transmitted by radio broadcast from the vehicle-implemented vehicle diagnosis system of the vehicle via the air interface to an air interface of another vehicle and in the other vehicle are transmitted to a mobile user communication terminal that is associated with the other vehicle by a further vehicle diagnosis interface.

13. The method according to claim 1, characterized in that the vehicle communication is with a vehicle-independent center and comprises automatically authenticating the vehicle, wherein the authentication is based on an authorization code that is transmitted during the vehicle communication.

14. The method according to claim 13, characterized in that the authorization code is based on a combination of at least two codes, wherein the at least two codes are selected from the group comprising:
a vehicle code that is used for vehicle identification,
a communication code that relates to the mobile user communication terminal,
an interface code that is used for interface identification.

15. The method according to claim 1, characterized in that the instruction specification contains on the mobile user communication terminal, a user programmed software application, wherein the instruction specification is designed for one or more functions that are selected from the group consisting of: vehicle control proposal and/or repair, accident examination and notification, journey route stipulation and analysis, journey route and/or driving behavior cost balancing, vehicle passport data update and storage, and driving behavior control and analysis.

16. An interface module for implementing the method according to claim 1, having:
a memory and a logic unit, wherein
the logic unit is designed to execute a software module with an instruction protocol for implementing the instruction specification, wherein the instruction specification is designed to predetermine relevant supplementary data for the immediate driving situation of the vehicle, and the memory is designed to store the vehicle diagnosis data and/or the relevant supplementary data.

17. A vehicle diagnosis interface having the interface module according to claim 16, characterized in that the interface connector is an OBD connector or an SAE connector or an RJ connector.

18. The method according to claim 1, wherein the mobile user communication terminal is configured to receive the vehicle diagnosis data from the vehicle-implemented vehicle diagnosis system of the vehicle via the air interface and is configured to execute the instruction specification.

19. A data network system for carrying out the method of claim 1, the data network system configured to receive the vehicle diagnosis data and supplementary data, and the data network system is further configured to execute the instruction specification.

20. A diagnosis and control network having a multiplicity of vehicles that each have a vehicle-implemented vehicle diagnosis system, which is limited to vehicle diagnosis, within the framework of a vehicle control system of a vehicle having a vehicle bus and a vehicle system interface connected to the vehicle bus, comprising:
  an air interface for transmitting vehicle diagnosis data to a user communication terminal,
  a communication network, via which vehicle diagnosis data is transmitted to a data network system,
  the data network system, by means of which the vehicle diagnosis data is made available to a mobile user communication terminal,
  characterized by
  a vehicle diagnosis interface in the form of a connector, as a couplable adapter having an interface connector that is compatible with the vehicle system interface, having an interface module and having the air interface for the vehicle-implemented vehicle diagnosis system of the respective vehicle, wherein
  said user communication terminal and/or the data network system is designed to augment the vehicle diagnosis data with supplementary data obtained outside the vehicle diagnosis system, wherein the supplementary data go beyond vehicle diagnosis data, and are associated with the vehicle diagnosis data for an immediate driving situation by means of an instruction specification on the user communication terminal and/or the interface module, wherein
  a relevance of the supplementary data to the immediate driving situation of the vehicle is predetermined by means of filtering in the instruction specification;
  wherein a verifiable proposal for a vehicle control function is made following transmission of the vehicle diagnosis data and the supplementary data back as far as to the vehicle diagnosis interface.

21. The method according to claim 1, further comprising transmitting vehicle diagnosis data from the vehicle diagnosis system to a data network system via said air interface, and making the vehicle diagnosis data available to the mobile user communication terminal.

22. The method according to claim 5, wherein the communication network is an Internet.

23. the method according to claim 6, wherein the local area network is a WiFi or WLAN network.

24. The method according to claim 11, wherein the location data is obtained from a communication network, or a global positioning system, and the location time data is in the form of uninfluenced supplementary data that are in the form of substantiation data for verifying a vehicle time and/or location.

25. The method according to claim 1, wherein the vehicle diagnosis data and/or the supplementary data are encrypted by an identification number from the vehicle and/or from the mobile user communication terminal and/or from the vehicle diagnosis interface as a key.

26. The method according to claim 15, wherein the instruction specification is on the mobile user communication terminal.

27. The method according to claim 1, characterized in that vehicle diagnosis data and/or supplementary data are transmitted between the vehicle diagnosis interface and the data network system via a communication network.

28. The method according to claim 27, wherein the communication network is an Internet.

29. A method for vehicle communication via a vehicle-implemented vehicle diagnosis system, which is limited to vehicle diagnosis, within a framework of a vehicle control system for a vehicle having a vehicle bus and a vehicle system interface connected to the vehicle bus, comprising:
  plugging a vehicle diagnosis interface in the form of a connector into a connector of the vehicle system interface and coupling said vehicle diagnosis interface directly to the vehicle bus, said vehicle diagnosis interface compatible with the vehicle system interface and having an interface module and an air interface,
  transmitting vehicle diagnosis data via the air interface to a mobile user communication terminal,
  augmenting the vehicle diagnosis data with supplementary data obtained outside the vehicle diagnosis system, wherein the supplementary data go beyond vehicle diagnosis data,
  associating the supplementary data with the vehicle diagnosis data for an immediate driving situation by an instruction specification on the interface module, and
  predetermining a relevance of the supplementary data to the immediate driving situation of the vehicle by filtering the supplementary data in the instruction specification;
  wherein the vehicle diagnosis data and/or the supplementary data are encrypted using an unchangedly fixed key.

30. The method according to claim 1, wherein the vehicle diagnosis data and the supplementary data are transmitted in a data packet.

* * * * *

UNITED STATES PATENT AND TRADEMARK OFFICE
CERTIFICATE OF CORRECTION

PATENT NO. : 9,538,374 B2  
APPLICATION NO. : 14/122107  
DATED : January 3, 2017  
INVENTOR(S) : Stephan Kaufmann and Alexander Marten Page 1 of 1

It is certified that error appears in the above-identified patent and that said Letters Patent is hereby corrected as shown below:

On the Title Page

Item (54) and in the Specification, Column 1, Line 5, title, please amend "INTERACE" to read --INTERFACE--.

Signed and Sealed this  
Thirtieth Day of May, 2017

Michelle K. Lee  
*Director of the United States Patent and Trademark Office*